(12) United States Patent
Rose et al.

(10) Patent No.: US 8,462,152 B2
(45) Date of Patent: Jun. 11, 2013

(54) APPARATUS AND METHOD FOR PROVIDING A SEQUENCE OF VIDEO FRAMES, APPARATUS AND METHOD FOR PROVIDING A SCENE MODEL, SCENE MODEL, APPARATUS AND METHOD FOR CREATING A MENU STRUCTURE AND COMPUTER PROGRAM

(75) Inventors: Dirc Rose, Neckarsulm (DE); Torsten Blank, Karlsruhe (DE); Oliver Schneider, Ettlingen (DE)

(73) Assignee: Nero AG, Karlsbad (DE)

( * ) Notice: Subject to any disclaimer, the term of this patent is extended or adjusted under 35 U.S.C. 154(b) by 1016 days.

(21) Appl. No.: 12/282,497

(22) PCT Filed: Jan. 3, 2007

(86) PCT No.: PCT/EP2007/000024
§ 371 (c)(1),
(2), (4) Date: Feb. 25, 2009

(87) PCT Pub. No.: WO2007/104372
PCT Pub. Date: Sep. 20, 2007

(65) Prior Publication Data
US 2010/0150526 A1    Jun. 17, 2010

Related U.S. Application Data

(60) Provisional application No. 60/781,006, filed on Mar. 10, 2006.

(30) Foreign Application Priority Data

Mar. 10, 2006   (EP) ..................................... 06005001

(51) Int. Cl.
*G06F 21/00*   (2006.01)

(52) U.S. Cl.
USPC .......................................................... 345/420

(58) Field of Classification Search
USPC ............................................. 386/95; 345/420
See application file for complete search history.

(56) References Cited

U.S. PATENT DOCUMENTS 4,752,836 A *  6/1988  Blanton et al. ................ 386/201
5,353,391 A   10/1994  Cohen et al.
(Continued)

FOREIGN PATENT DOCUMENTS

EP         1148412 A2    4/2001

OTHER PUBLICATIONS

Jia-Jun, et al.; "A framework to create video-transition effects"; Aug. 4, 2005; Journal of Zheijang University, vol. 6A, No. 1, pp. 58-65, retrieved from website: http://www.zju.edu.cn/jzus/2005/A05S1/A05S110.pdf.

(Continued)

*Primary Examiner* — Brandon Hoffman
*Assistant Examiner* — Anthony Brown
(74) *Attorney, Agent, or Firm* — Michael A. Glenn; Glenn Patent Group

(57) ABSTRACT

An apparatus for providing a sequence of video frames includes a video frame generator adapted to provide the video frames on the basis of the scene model. The video frame generator is adapted to identify within the scene model a scene model object having a predetermined object name or a predetermined object property, and to generate the sequence of video frames such that user-provided content is displayed on a surface of the identified scene model object or as a replacement for the identified scene model object.
An apparatus for creating a menu structure of a video medium includes an apparatus for providing a sequence of video frames. The apparatus is adapted to generate the sequence of video frames being part of the menu structure on the basis of a scene model, on the basis of additional information, and on the basis of a menu structure-related characteristic.

22 Claims, 24 Drawing Sheets

U.S. PATENT DOCUMENTS

| | | | |
|---|---|---|---|
| 5,748,192 A | 5/1998 | Lindholm | |
| 6,222,540 B1 | 4/2001 | Sacerdoti | |
| 2002/0033828 A1* | 3/2002 | Deering et al. | 345/502 |
| 2003/0005442 A1 | 1/2003 | Brodersen et al. | |
| 2003/0079224 A1 | 4/2003 | Komar et al. | |
| 2003/0193520 A1 | 10/2003 | Oetzel | |
| 2004/0189668 A1 | 9/2004 | Beda et al. | |
| 2005/0094879 A1* | 5/2005 | Harville | 382/209 |
| 2006/0008239 A1 | 1/2006 | Huang et al. | |

OTHER PUBLICATIONS

Alexzander, Alex; "DVD Studio Pro 3, Parts 1-4"; Jun. 30, 2004; pp. 1-63, retrieved from websites: http://www.lafcpug.org/basic_sp3_transitions.html and http://www.lafcpug.org/basic_sp3_alpha.html and http://www.lafcpug.org/basic_sp3_graphic.html and http://www.lafcpug.org/basic_sp3_part4.html.

* cited by examiner cube 1:
   name :
   position (x,y,z):
   rotazion ($\phi, \theta$)

surface 1:
     texture : video 1
     material :
     attribute :

surface 2 :
     texture : video 2
     material :
     attribute :

surface 3 :
     :
     :
     :

observation point :
   position (x,y,z) :
   view direction ($\phi, \theta$) :
   viewing angle ($\phi_{Hor}, \phi_{Vert}$) :

motion :
   cube 1:
     position over time:
     rotation over time :

observation point :
   position over time:
   view angle over time:

APPARATUS AND METHOD FOR PROVIDING A SEQUENCE OF VIDEO FRAMES, APPARATUS AND METHOD FOR PROVIDING A SCENE MODEL, SCENE MODEL, APPARATUS AND METHOD FOR CREATING A MENU STRUCTURE AND COMPUTER PROGRAM

BACKGROUND OF THE INVENTION

The present invention is generally related to an apparatus and method for providing a sequence of video frames, an apparatus and method for providing a scene model, a scene model, an apparatus and method for creating a menu structure and a computer program. In particular, the present invention is related to a concept for the automatic generation of animated scenes for the creation of interactive menus and video scenes.

In the last years, the performance of home entertainment equipment has steadily increased. In the meantime, consumers are even able to generate their own digital videos and save the digital videos to a storage medium. However, up to now it is not easily possible to create elaborate transitions between video scenes or between menu pages or between a menu page and a video scene without having a deep knowledge of a programming language.

Also, for software companies who are trying to provide the consumers with a solution to create elaborate video transitions, this task brings along a very big effort, as it is typically necessary to provide separate code for any algorithms for the production of a transition.

SUMMARY

According to an embodiment, an apparatus for providing a sequence of video frames on the basis of a scene model defining a three-dimensional pre-modeled scene, the scene model including at least one scene model object having an object name or an object property, and on the basis of a user-provided content, may have: a video frame generator adapted to produce a sequence of a plurality of video frames on the basis of the scene model, wherein the video frame generator is adapted to parse the scene model to identify within the scene model one or more scene model objects or surfaces having a predetermined name or a predetermined property, to achieve an identified scene model object or surface; and wherein the video frame generator is adapted to insert into the scene model a reference indicating to apply the user-provided content as a texture for an identified surface, to adapt the scene model to user requirements or wherein the video frame generator is adapted to set a texture property of an identified object or surface to designate the user-provided content as a texture to be applied, to adapt the scene model to user requirements; and wherein the video frame generator is adapted to render the sequence of video frames on the basis of the scene model, such that the sequence of video frames shows a view of the scene described by the scene model as seen by an observer at an observation point, and such that the user-provided content is displayed on a surface of an identified scene model object or on an identified surface, taking into consideration a relative position of the scene model objects with respect to each other and with respect to an observation point, wherein the scene model defines a scene in terms of a listing of geometrical objects, characteristics of the objects present in the scene and characteristics defining a portion of the scene model which is visible for an observer at the observation point; and wherein the scene model defines the scene in terms of material characteristics or surface texture characteristics of at least one scene model object.

According to another embodiment, a method for providing a sequence of video frames on the basis of a scene model defining a three-dimensional pre-modeled scene, the scene model including at least one scene model object having an object name or an object property, and on the basis of a user-provided content, may have the steps of: producing a sequence of a plurality of video frames on the basis of the scene model, wherein the scene model defines a scene in terms of a listing of geometrical objects, characteristics of the objects present in the scene and characteristics defining a portion of the scene model which is visible for an observer at the observation point, and wherein the scene model defines the scene in terms of material characteristics or surface texture characteristics of at least one scene model object; wherein producing the sequence of a plurality of video frames may have the steps of: parsing the scene model to identify within the scene model one or more scene model objects or surfaces having a predetermined name or a predetermined property, to achieve an identified scene model object or surface; inserting into the scene model a reference indicating to apply the user-provided content as a texture for an identified surface, to adapt the scene model to user requirements, or setting a texture property of an identified object or surface to designate the user-provided content as the texture to be applied, to adapt the scene model to user requirements; and rendering the sequence of video frames on the basis of the scene model, such that the sequence of video frames shows a view of the scene described by the scene model as seen by an observer at an observation point, and such that the user-provided content is displayed on a surface of the identified scene model object or on an identified surface, taking into consideration a relative position of the scene model objects with respect to each other and with respect to an observation point.

According to another embodiment, an apparatus for creating a menu structure of a video medium on the basis of a scene model defining a pre-modeled scene, the scene model including at least one scene model object having an object name or an object property, on the basis of menu-structure-related information defining at least one menu-structure-related characteristic, and on the basis of a user-provided content, may have: an apparatus for providing a sequence of video frames on the basis of a scene model defining a three-dimensional pre-modeled scene, the scene model including at least one scene model object having an object name or an object property, and on the basis of a user-provided content, wherein the apparatus may have: a video frame generator adapted to produce a sequence of a plurality of video frames on the basis of the scene model, wherein the video frame generator is adapted to parse the scene model to identify within the scene model one or more scene model objects or surfaces having a predetermined name or a predetermined property, to achieve an identified scene model object or surface; and wherein the video frame generator is adapted to insert into the scene model a reference indicating to apply the user-provided content as a texture for an identified surface, to adapt the scene model to user requirements or wherein the video frame generator is adapted to set a texture property of an identified object or surface to designate the user-provided content as a texture to be applied, to adapt the scene model to user requirements; and wherein the video frame generator is adapted to render the sequence of video frames on the basis of the scene model, such that the sequence of video frames shows a view of the scene described by the scene model as seen by an observer at an observation point, and such that the user-provided content is displayed on a surface of an identified scene model object or on an identified surface, taking into consideration a relative position of the scene model objects with respect to each other and with respect to an observation point, wherein the scene model defines a scene in terms of a listing of geometrical objects, characteristics of the objects present in the scene and characteristics defining a portion of the scene model which is visible for an observer at the observation point; and wherein the scene model defines the scene in terms of material characteristics or surface texture characteristics of at least one scene model object, wherein the apparatus for providing the sequence of video frames is adapted to generate the sequence of video frames on the basis of the scene model, on the basis of the additional information defining at least one menu-structure related characteristic, and on the basis of the user-provided content.

According to another embodiment, a method for creating a menu structure of a video medium on the basis of a scene model defining a pre-modeled scene, the scene model including at least one scene model object having an object name or an object property, on the basis of menu-structure-related information defining at least one menu-structure-related characteristic, and on the basis of a user-provided content, may have the steps of: providing a sequence of video frames on the basis of a scene model defining a three-dimensional pre-modeled scene, the scene model including at least one scene model object having an object name or an object property, and on the basis of a user-provided content, wherein the method may have the steps of: producing a sequence of a plurality of video frames on the basis of the scene model, wherein the scene model defines a scene in terms of a listing of geometrical objects, characteristics of the objects present in the scene and characteristics defining a portion of the scene model which is visible for an observer at the observation point, and wherein the scene model defines the scene in terms of material characteristics or surface texture characteristics of at least one scene model object; wherein producing the sequence of a plurality of video frames may have the steps of: parsing the scene model to identify within the scene model one or more scene model objects or surfaces having a predetermined name or a predetermined property, to achieve an identified scene model object or surface; inserting into the scene model a reference indicating to apply the user-provided content as a texture for an identified surface, to adapt the scene model to user requirements, or setting a texture property of an identified object or surface to designate the user-provided content as the texture to be applied, to adapt the scene model to user requirements; and rendering the sequence of video frames on the basis of the scene model, such that the sequence of video frames shows a view of the scene described by the scene model as seen by an observer at an observation point, and such that the user-provided content is displayed on a surface of the identified scene model object or on an identified surface, taking into consideration a relative position of the scene model objects with respect to each other and with respect to an observation point, wherein providing the sequence of video frames includes generating the sequence of video frames on the basis of the scene model, on the basis of the additional information defining at least one menu-structure-related characteristic, and on the basis of the user-provided content.

An embodiment may have: a computer program for executing, when the computer program runs on a computer, a method for providing a sequence of video frames on the basis of a scene model defining a three-dimensional pre-modeled scene, the scene model including at least one scene model object having an object name or an object property, and on the basis of a user-provided content, wherein the method may have the steps of: producing a sequence of a plurality of video frames on the basis of the scene model, wherein the scene model defines a scene in terms of a listing of geometrical objects, characteristics of the objects present in the scene and characteristics defining a portion of the scene model which is visible for an observer at the observation point, and wherein the scene model defines the scene in terms of material characteristics or surface texture characteristics of at least one scene model object; wherein producing the sequence of a plurality of video frames may have the steps of: parsing the scene model to identify within the scene model one or more scene model objects or surfaces having a predetermined name or a predetermined property, to achieve an identified scene model object or surface; inserting into the scene model a reference indicating to apply the user-provided content as a texture for an identified surface, to adapt the scene model to user requirements, or setting a texture property of an identified object or surface to designate the user-provided content as the texture to be applied, to adapt the scene model to user requirements; and rendering the sequence of video frames on the basis of the scene model, such that the sequence of video frames shows a view of the scene described by the scene model as seen by an observer at an observation point, and such that the user-provided content is displayed on a surface of the identified scene model object or on an identified surface, taking into consideration a relative position of the scene model objects with respect to each other and with respect to an observation point.

Another embodiment may have: a computer program for executing, when the computer program runs on a computer, a method for creating a menu structure of a video medium on the basis of a scene model defining a pre-modeled scene, the scene model including at least one scene model object having an object name or an object property, on the basis of menu-structure-related information defining at least one menu-structure-related characteristic, and on the basis of a user-provided content, wherein the method may have the steps of: providing a sequence of video frames on the basis of a scene model defining a three-dimensional pre-modeled scene, the scene model including at least one scene model object having an object name or an object property, and on the basis of a user-provided content, wherein the method may have the steps of: producing a sequence of a plurality of video frames on the basis of the scene model, wherein the scene model defines a scene in terms of a listing of geometrical objects, characteristics of the objects present in the scene and characteristics defining a portion of the scene model which is visible for an observer at the observation point, and wherein the scene model defines the scene in terms of material characteristics or surface texture characteristics of at least one scene model object; wherein producing the sequence of a plurality of video frames may have the steps of: parsing the scene model to identify within the scene model one or more scene model objects or surfaces having a predetermined name or a predetermined property, to achieve an identified scene model object or surface; inserting into the scene model a reference indicating to apply the user-provided content as a texture for an identified surface, to adapt the scene model to user requirements, or setting a texture property of an identified object or surface to designate the user-provided content as the texture to be applied, to adapt the scene model to user requirements; and rendering the sequence of video frames on the basis of the scene model, such that the sequence of video frames shows a view of the scene described by the scene model as seen by an observer at an observation point, and such that the user-provided content is displayed on a surface of the identified scene model object or on an identified surface, taking into consideration a relative position of the scene model objects with respect to each other and with respect to an observation point, wherein providing the sequence of video frames includes generating the sequence of video frames on the basis of the scene model, on the basis of the additional information defining at least one menu-structure-related characteristic, and on the basis of the user-provided content.

According to another embodiment, an apparatus for providing a sequence of video frames on the basis of a scene model defining a three-dimensional pre-modeled scene, the scene model including at least one three-dimensional scene model object having an object name or an object property, and on the basis of a user-provided content in the form of one or more three-dimensional objects, may have: a video frame generator adapted to produce a sequence of a plurality of video frames on the basis of the scene model, wherein the video frame generator is adapted to parse the scene model to identify within the scene model one or more scene model objects having a predetermined object name or a predetermined object property, to achieve an identified three-dimensional scene model object; wherein the video frame generator is adapted to replace the identified scene model object with the user-provided content, to adapt the scene model to user requirements; and wherein the video frame generator is adapted to render the sequence of video frames on the basis of the scene model, such that the user-provided content is displayed as a replacement for the identified scene model objects, wherein the scene model defines a scene in terms of a listing of geometrical objects and characteristics of the objects present in the scene.

The present invention creates an apparatus for providing a sequence of video frames on the basis of a scene model defining a scene according to claim 1.

It is the key idea of the present invention that a sequence of video frames can efficiently and flexibly be generated by displaying a user-provided content on an identified surface of an identified scene model object of the scene model, or as a replacement for an identified scene model object of the scene model.

It has been found that in a scene model a scene model object or a surface of a scene model object can be identified by a predetermined object name, surface name, object property or surface property. Once an object or a surface thereof is identified, a video frame generator which is adapted to generate a sequence of video frames based on the scene model comprising the identified object or surface can be caused to display a user-provided content, e.g. a user-provided image, a user-provided video frame or a user-provided video sequence, on the identified surface or as a replacement for the identified object.

Thus, a two-dimensional user-defined content can be introduced into a predefined scene model, wherein a surface or a face of an object of the predefined scene model serves as a place-holder surface.

Alternatively, a three-dimensional user-provided object (or user provided content) can be introduced into a sequence of video frames described in terms of a scene model by replacing an identified place-holder object in the scene model by the user-provided three-dimensional object.

In other words, it was found that both surfaces and objects in a scene model may serve as place holders for user-provided content (e.g. in the form of an image, a video frame, a sequence of video frames, or a three-dimensional object).

The place-holder objects may be identified by a predetermined name or a predetermined object property. The provided content can thus be introduced into the scene model by the video frame generator which is adapted to produce a sequence of a plurality of video frames on the basis of the scene model and the user-provided content.

The present invention further provides an apparatus for providing a scene model defining a three-dimensional video scene according to claim 16. The apparatus comprises an interface for receiving a description of a video scene and a place-holder inserter. According to the key idea of the present invention, the place-holder inserter is adapted to insert a place-holder name or place-holder property into the scene model such that the place-holder name or place-holder property designates an object or surface to be associated with a user-provided content. In other words, the apparatus for providing the scene model creates a scene model for use in the inventive apparatus for providing a sequence of video frames. For this purpose, the apparatus for providing the scene model introduces a place-holder surface or a place-holder object into the scene model which can be identified by the apparatus for providing a sequence of video frames and which can be used to display the user-provided content.

The present invention further creates a scene model according to claim 18, the scene model having at least one place-holder object or at least one place-holder name or at least one place-holder property associating the placeholder object or a placeholder surface with the user-provided content. Thus, the inventive scene model is adapted for use with the apparatus for providing a sequence of video frames.

The present invention further creates methods according to claims 23 and 24.

The present invention creates an apparatus for creating a menu structure of a video medium according to claim 25.

The inventive method for creating a menu structure of a video medium brings along the advantage, that the video structure is automatically adapted to the menu-structure related information by combining the menu-structure-related information with the scene model. Thus, the video frames generated by the apparatus for creating the menu structure are adapted using the menu-structure-related information.

In other words, the scene described by the scene model is modified in dependence on the menu-structure related information. Consequently, the sequence of video frames is adapted to the requirements of the user, while still being based on the scene model. Thus, user provided content is introduced into the sequence of video frames, customizing the sequence of video frames. However, the overall scenery is still described by the scene model, which serves as a template, predefining the scenery.

The present invention further creates a method for creating a menu structure of a video medium according to claim 30 and a computer program according to claim 31.

Further advantageous embodiments of the present invention are defined by the dependent claims.

BRIEF DESCRIPTION OF THE DRAWINGS

Embodiments of the present invention will be detailed subsequently referring to the appended drawings, in which:

FIG. 3 shows a listing describing the scene model shown in FIG. 2;

DETAILED DESCRIPTION OF THE INVENTION

Figure 1:
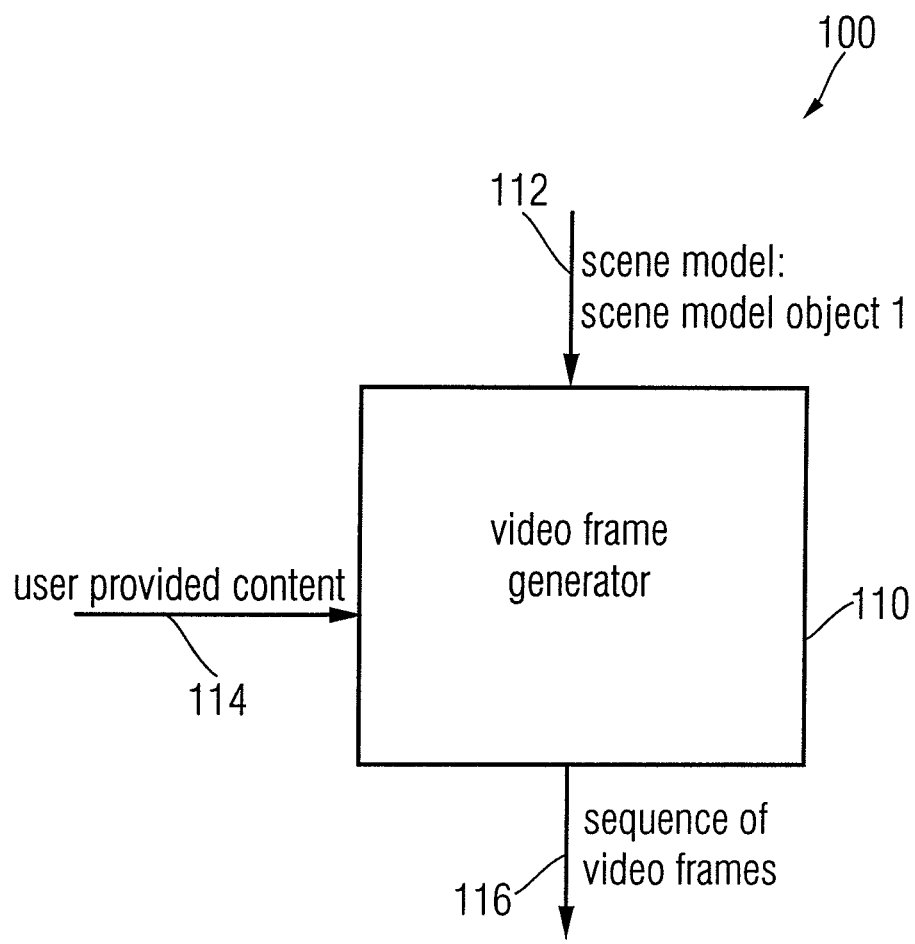
FIG. 1 shows a block schematic diagram of an inventive apparatus for providing a sequence of video frames on the basis of a scene model defining a scene and on the basis of user-provided content.

FIG. 1 shows a block schematic diagram of an inventive apparatus for providing a sequence of video frames on the basis of a scene model defining a scene. The apparatus of FIG. 1 is designated in its entirety with 100. The apparatus 100 comprises a video frame generator 110. The video frame generator 110 is adapted to receive a scene model 112 and a user-provided content 114. Furthermore, the video frame generator 110 is adapted to provide a sequence 116 of video frames.

It should be noted that the scene model 112 received by the video frame generator comprises at least one scene model object having an object name or an object property. For example, the scene model may comprise a description of a plurality of objects arranged in a two-dimensional or, advantageously, three-dimensional space. At least one object has at least an object name or an object property associated with the respective object.

Besides, the user-provided content 114 may, for example, comprise an image, a video frame, a sequence of video frames or a description of at least one two-dimensional or three-dimensional object.

The video frame generator 110 is adapted to produce a sequence 116 of a plurality of video frames on the basis of the scene model and the user-provided content. The frame generator 110 is adapted to identify within the scene model 112 a scene model object having a predetermined object name or a predetermined object property, to obtain an identified scene model object. Identifying a scene model object having a predetermined object name or a predetermined object property may comprise identifying a particular surface of the identified scene model object.

Besides, the video frame generator 110 is adapted to generate a sequence of video frames such that the user-provided content 114 is displayed on a surface of the identified scene model object. Alternatively, the video frame generator 110 may be adapted to display the user-provided content 114 as a replacement for the identified scene model object.

It should be noted here that it is advantageous to display the user-provided content on a surface of the identified scene model object, if the user-provided content 114 is an image, a video frame or a sequence of video frames. On the other hand, it is advantageous to replace the identified scene model object with the user-provided content 114, if the user-provided content 114 is a description of a two-dimensional replacement scene model object or a three-dimensional replacement scene model object.

Thus, the video frame generator 110 provides a sequence 116 of video frames in which the user-provided content is displayed in a form which is controlled by the scene model 112. Consequently, the scene model 112 may be considered to be a template for the sequence 116 of video frames, which describes a scene to be displayed, wherein the displayed scene is supplemented by the user-provided content.

In the following, further details with respect to the scene model 112, the user-provided content 114 and the generation of the sequence 116 of video frames will be described.

Figure 2:
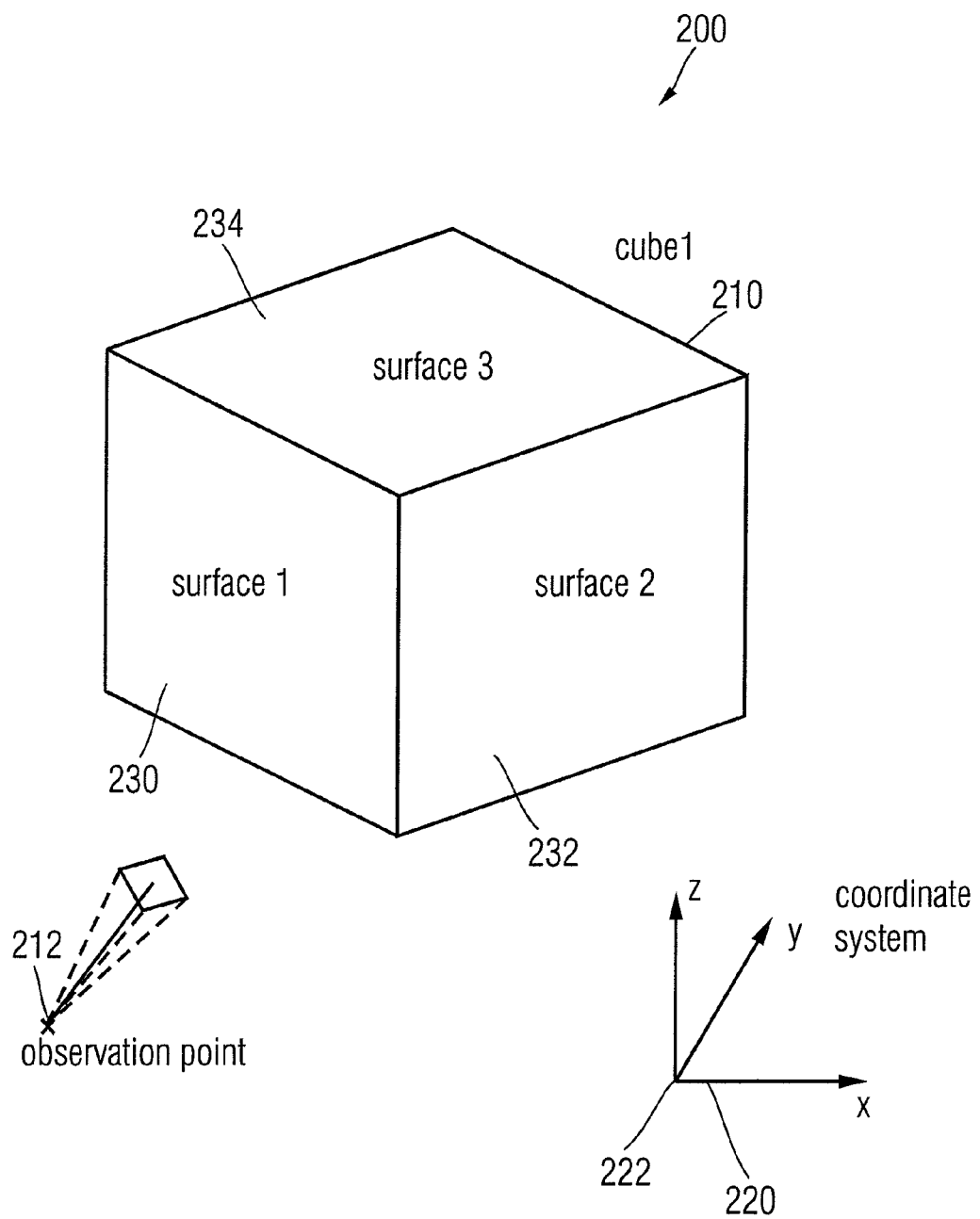
FIG. 2 shows a graphical representation of the scene model representing a cube.

FIG. 2 shows a graphical representation of an exemplary scene model for use with the present invention. The scene model is designated in its entirety with 200. The scene model 200 comprises a cube 210 and an observation point 212. The cube 210 and the observation point 212 are arranged in a three-dimensional space, wherein a position and orientation of the cube 210 and the observation point 212 may be described with reference to a coordinate system 220. While only one of a plurality of possible coordinate systems (having directions x, y, z) is shown, any arbitrary coordinate system could be used.

It should be noted here that the cube 210, which is also designated as "cube1" comprises a total of six surfaces, three of which are shown here. For example, the cube 210 comprises a first surface 230, a second surface 232 and a third surface 234. Furthermore, it should be noted that an advantageous point within the cube and an advantageous direction within the cube may be defined in order to describe a location and an orientation of the cube. For example, the position and orientation of the cube may be described in terms of a position of the center (or point of gravity) of the cube 210 and an advantageous direction of the cube 210. The advantageous direction may, for example, be a direction being normal on the first surface 230, pointing outward from the first surface 230. Consequently, a position of the cube 210 may be described by three scalar coordinates (e.g. coordinates x, y, z) indicating the position of the cube with respect to an origin 222 of the coordinate system 220. Furthermore, two additional coordinates (e.g. 2 angle coordinates $\phi$, $\theta$) may be used to define the advantageous direction or the orientation of the cube 210.

Furthermore, the scene model 220 comprises the observation point 212, the position of which may, for example, be described by three coordinates with reference to the origin 222 of the coordinate system 220. Also, optionally a viewing direction or viewing sector may be defined for the observation point 212. In other words, it may be defined in which direction an observer assumed to be at the observation point 212 is looking, and/or which region of the scene model is visible to the observer. The direction of observation may, for example, be described in terms of two coordinates specifying a direction. Furthermore, with respect to the observation point 212 a horizontal viewing angle and/or a vertical viewing angle may be defined indicating which part of the scene model 220 can be seen by the observer located at the observation point 212.

In general, the scene model 200 comprises a definition which portion of the scene model 200 (e.g. in terms of a viewing angle) is visible for an observer at the observation point 212.

In other words, the scene model 200 comprises a definition of at least one object (e.g. the cube 210), characteristics (e.g. names or properties) of at least one object, and, optionally, characteristics regarding an observer and defining a portion of the scene model 200 which is visible for the observer at the observation point 212.

FIG. 3 shows an exemplary listing of a scene model, for the scene model of FIG. 2. The listing of FIG. 3 is designated in its entirety with 300.

It should be noted here that the listing of the scene model may, for example, be defined in a structured description language (e.g. an XML description language, or a proprietary description language), and that the listing of the scene model may take any possible form of a description. Also, it should be noted that all the characteristics outlined in the following example should be considered to be optional, and may be replaced by other characteristics, or may completely be omitted.

With reference to FIG. 3, the listing 300 indicates that the scene model 200 comprises a cube 210. In the listing 300, an identifier "cube1" is used to designate the cube 210. The listing 300 comprises a number of characteristics of the cube 210. The characteristics may, for example, comprise a name attributed to the cube 210 (characteristic "name") and a position of the cube 210 (attribute "position"), for example in a Cartesian coordinate system (x, y, z). The listing 300 defining the scene model may also comprise a parameter defining a rotation of the cube 210, described, for example, in terms of two angular parameters $\phi$, $\theta$.

Moreover, the description 300 of the scene model 200 may comprise further details about the surfaces of the cube 210. For example, the description of the first surface 230 (designated by the attribute "surface 1") may comprise information about a texture of the first surface 230 (attribute "texture"), an information about a material of the first surface 230 (attribute "material") and/or an additional information ("attribute") of the first surface 230.

In the given example, the scene model description 300 of the scene model 200 defines that the first surface 230 has the texture "video 1", indicating that a first user-provided video content should be displayed on the first surface 230 of the cube 210.

Further attributes may also be given for the second surface (designated as "surface 2" in the listing or scene model description 300). For example, it is defined that the second surface 232 ("surface 2") has the texture named "video 2", indicating that the second user-provided video content should be displayed on the second surface 232. Similar characteristics or attributes may be given for the other surfaces of the cube 210.

The scene model description of the listing 300 further comprises information about the observation point 212. For example, a position of the observation point 212 may be given in terms of Cartesian coordinates (x, y, z) (cf. attribute "position") and of the observation point. Furthermore, a view direction (i.e. a direction in which an observer located at the observation point 212 is looking) may be defined for the observation point in terms of respective parameters (attributes "view direction"). Besides, optionally a viewing angle may be defined for the observer at the observation point 212 (attribute "viewing angle"). The viewing angle defines which portion of the scene model is visible for the observer at the observation point 212.

Moreover, the scene model description of the listing 300 may optionally describe a motion of any object within the scene model. For example, it may be described how the cube 210 moves over time, wherein the description may be given in terms of a sequence of position and/or orientation parameters of the cube 210. Alternatively, a direction of movement of the cube 210 and/or a velocity of the movement of the cube 210 may be described by the scene model description of the listing 300. It should be noted here that the scene model description of the listing 300 may comprise both a description of a development of a position of the cube 210 over time and of the orientation of the cube 210 over time.

Furthermore, the scene model description of the listing 300 may alternatively or additionally comprise a description of a variation of a position of the observation point over time and/or a variation of a view direction of the observer over time and/or a variation of the viewing angle of the observer over time.

In other words, the scene model description may comprise both a description of the scene model at a given instance in time and a description of a temporal development of the scene model over time.

The video frame generator 110 is, in an embodiment, adapted to evaluate the scene model description (e.g. as given by the listing 300) and to generate on the basis of the scene model description the sequence 316 of video frames. For example, the video frame generator 110 may evaluate the scene model description valid at a first instance of time to obtain a first video frame. The video frame generator 110 may further evaluate a scene model description valid at a second instance of time to obtain a second video frame for the second instance of time. The scene model description for the second instance of time may either be given in an individual scene model description valid for the second instance of time or may be determined using the scene model description for the first instance of time and a time development description or motion description describing a change of the scene model between the first instance in time and the second instance in time.

Figure 4:
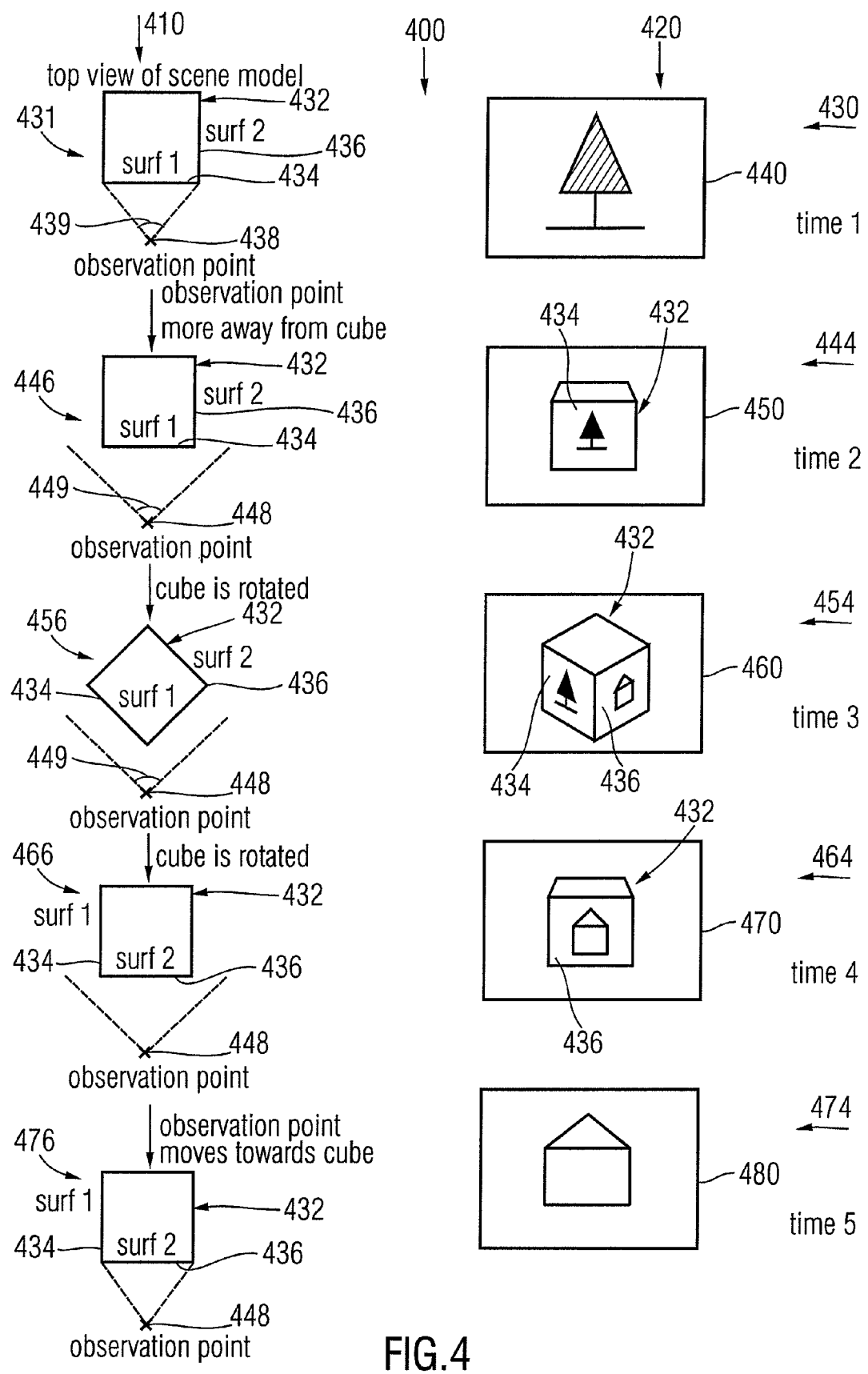
FIG. 4 shows a graphical representation of a transition between a first sequence of video frames and a second sequence of video frames, as defined by a time-variant scene model and two user-defined sequences of video frames.

FIG. 4 shows an example of a graphical representation of a generation of a sequence of video frames based on the scene model 112 and user-provided content 114 using the video frame generator 110. The graphical representation of FIG. 4 is designated in its entirety with 400. The left column 410 of the graphical representation 400 shows a top view of a scene model at different instances in time. A second column 420 shows generated video frames of the sequence 116 of video frames for different instances in time. A first row 430 shows a top view of a scene model and a corresponding video frame out of the sequence 116 of video frames at a first instance of time. The scene model for the first instance of time shows a top view of a cube 432 having a first surface 434 and a second surface 436. It should be noted here that the cube 432 is equivalent to the cube 210 of FIG. 2. The first surface 434 of the cube 432 is equivalent to the first surface 230 of the cube 210, the second surface 436 of the cube 432 is equivalent to the second surface 232 of the cube 210. The first surface 434 of the cube 432 has a property (e.g. a name, a material designator, a texture designator or an attribute) indicating that the first surface 432 is associated with a first user-provided content. In the example of FIG. 4, it is assumed that the first surface 434 is associated with a first user-provided image, a first user-provided video frame or a first user-provided sequence of video frames. Furthermore, it is assumed that the second surface 136 is associated (by means of a corresponding setting of a property) with a second user-provided image, a second user-provided video frame or a second user-provided sequence of video frames. At the first instance of time the scene model further comprises a description of an observation point 438 and a viewing angle 439. The viewing angle 439 is chosen such that an observer at the observation point 438 sees a full screen image of the first surface 434.

Based on the scene model for the first instance of time, the video frame generator 110 generates a video frame showing a view of a scene described by the scene model, as seen by the observer at the observation point 438, the observer at the observation point 438 being able to oversee the viewing angle 439. Thus, a video frame 440 generated by the video frame generator 110 shows the region of the scene model which is visible to the observer at the observation point 438. As it was defined before, the scene model is defined such that the observer at the observation point 438 perceives a full screen image of the first surface 434 and that the frame 440 shows a full screen image of the surface 434. As it was defined in the scene model that the first user-provided image, the first user-provided video frame or the first user-provided video sequence is associated with the first surface 434, the generated video frame 440 generated for the first instance of time shows a full screen image of the first user-provided image, a full-screen image of the first user-provided video frame or a full screen image of a video frame of the first user-provided sequence of video frames.

The second row 444 shows a scene model and a corresponding generated video frame at a second instance of time. The scene model 446 at the second instance of time is similar to the scene model 431 at the first instance of time. However, it should be noted that between the first instance of time and the second instance of time the observation point 438 was moved away from the cube 432. Thus, a new observation point 448 at the second instance of time is further away from the cube 432 when compared to the previous observation point. However, it is assumed that a viewing angle 449 at the second instance of time is identical to the viewing angle 439 at the first instance of time for the sake of simplicity (while it would be possible that the viewing angle 449 is different from the viewing angle 439). Thus, an observer at the observation point 448 at the second instance of time would see a larger portion of the scene when compared to the situation at the first instance of time. In other words, at the second instance of time an observer at the observation point 448 does not only see the first surface 436 of the cube 432, but also a part of the surrounding of the cube 432 (and possibly the top surface of the cube).

Thus, based on the scene model 446 at the second instance of time, the video frame generator 110 generates a second video frame 450, the second video frame 450 showing an image (e.g. a three-dimensional image) of the cube 432. As the first surface 436 of the cube is visible in the second frame 450, and as the first surface 436 is associated with the first user-provided image, the first user-provided video frame or the first user-provided sequence of video frames (the three alternatives will in the following be designated as the first user-provided content), the first user-provided content is displayed on the first surface 436 of the cube 432 in the second video frame 430. In order to achieve this, the video frame generator 410 may, for example, use the first user-provided content as a texture of the first surface 436 of the cube 432 when generating the second generated video frame 450.

It should be noted here that the first user-provided content at the first instance of time may be different from the first user-provided content at the second instance of time. For example, the video frame generator 110 may use a first video frame (e.g. of a user-provided sequence of video frames) at the first instance of time, and a second video frame (e.g. of a user-provided sequence of video frames) at the second instance of time.

It should further be noted that at the second instance of time the first user-provided content is no longer shown in the second generated video frame as a full screen image, but rather as a texture filling the first surface 434 of the cube 432. Thus, the first user-provided content only fills up a portion of the second generated video frame 450.

A third row 454 shows a scene model 456 and a resulting third generated video frame 460. It should be noted that for the sake of the example shown in FIG. 4, it is assumed that the scene model 456 at the third instance of time differs from the scene model 446 at the second instance in time only in that the cube 434 is rotated along a vertical axis (the vertical axis being perpendicular to the drawing plane).

Thus, an observer at the observation point 448 can see both the first surface 434 and the second surface 436 of the cube 432. A resulting third generated video frame 460 is also shown. It should be noted that a second user-provided content (e.g. a second user-provided image, a second user-provided video frame or a second user-provided sequence of video frames) is associated with the second surface 436 of the cube 432. Accordingly, the second user-provided content is shown on the second surface 436 of the cube 432 in the third generated video frame 460. In other words, the second user-provided content is used as a texture for the second surface 436 of the frame 432 when the video frame generator 110 generates the third generated video frame 460 on the basis of the scene model 456 and the second user-provided content. Similarly, the first user-provided content is used as a texture for the first surface 434 of the cube 432 when the video frame generator 110 generates the third generated video frame 460. Moreover, it should be noted that both the first user-provided content and the second user-provided content are shown simultaneously in the third generated video frame 460, wherein the first user-provided content and the second user-provided content are shown on two different surfaces of the cube 432.

To be more general, the present invention provides a solution to show the first user-provided content and the second user-provided content simultaneously on different surfaces, wherein the different surfaces, on which the first user-provided content and the second user-provided content are shown, may either belong to a single (typically three-dimensional) object or to different (typically three-dimensional) objects.

A fourth row 464 shows a scene model 466 and a corresponding generated video frame 470 at a fourth instance of time. As can be seen from the scene model 466, the scene model 466 merely differs from the scene model 456 in that the cube 432 is rotated further, so that the second surface 436 of the cube 432 is directed toward the observation point 448. The video frame generator 110 generates the fourth generated video frame 470 on the basis of the scene model 466. The resulting fourth generated video frame 470 is similar to the second generated video frame 450, wherein the second user-provided content is displayed as a texture on the second surface 436 of the cube 432, and wherein the second surface 436 of the cube 432 is directed towards the observation point.

A fifth row 474 shows a scene model 476 and a fifth generated video frame 480. The fifth scene model 476 differs from the fourth scene model 466 in that the observation point 482 in the fifth scene model 476 is located closer to the cube 432 than the observation point 448 in the fourth scene model 466. Advantageously, the observation point 482 and the cube 432 are located such in the scene model 476 that the observer at the observation point 482 sees (or perceives) the second surface 436 as a full screen image. Consequently, the fifth generated video frame shows the second user-provided content as a full screen image.

To summarize the above, the sequence of the five generated video frames 440, 450, 460, 470, 480 show a transition between the first user-provided content and the second user-provided content, wherein the first generated video frame 440 shows a full screen image of the first user-provided content, and wherein the fifth generated video frame shows a full screen image of the second user-provided content.

In an alternative embodiment, the scene models 431, 446, 456, 466, 476 may represent another transition between two scenes. For example, the scene models 431, 446, 456, 466, 476 may describe a transition between a menu page showing a plurality of menu items and a user-provided content. For example, the first scene model 431 may describe a full screen image of the menu page, and the last scene model 476 may describe a full screen image of the user-provided content. The intermediate scene models 446, 456, 466 in this case describe intermediate steps of an advantageously smooth transition between the first scene model 431 and the last scene model 476.

In an alternative embodiment, the scene models 431, 446, 456, 466, 476 may describe a transition between a first menu page showing a first plurality of menu items and a second menu page showing a second plurality of menu items. In this case, the first scene model may describe a full screen image of the first menu page, and the last scene model 476 may describe a full screen image of the second menu page. The intermediate scene models 446, 456, 466 may describe the intermediate steps of the transition between the first scene model 431 and the last scene model 476.

In an alternative embodiment, the scene models 431, 446, 456, 466, 476 may describe a transition between a user-provided content and a menu page. In this case, the first scene model 431 may advantageously describe an image of the user-provided content, and the last scene model 476 may describe an image of the menu page. A menu is an image of the 3D scenery at a first instance of time (e.g. at time t=0, for a normalized time parameter) or at a second instance of time (e.g. at time t=1, for a normalized time parameter). Intermediate scene models 446, 456, 466 may describe a (advantageously smooth) transition between the first scene model 431 and the last scene model 476.

Another possibility of application is that the first row 430 represents a presentation of a user provided content, the user provided content being shown in the video frame 440. Moreover, the third row 454 shows a presentation of a menu having three buttons (instead of 6 buttons, as usual). The three visible surfaces of the cube (shown in the video frame 460) may serve as buttons in the scene as shown in the third row 454.

Figure 5:
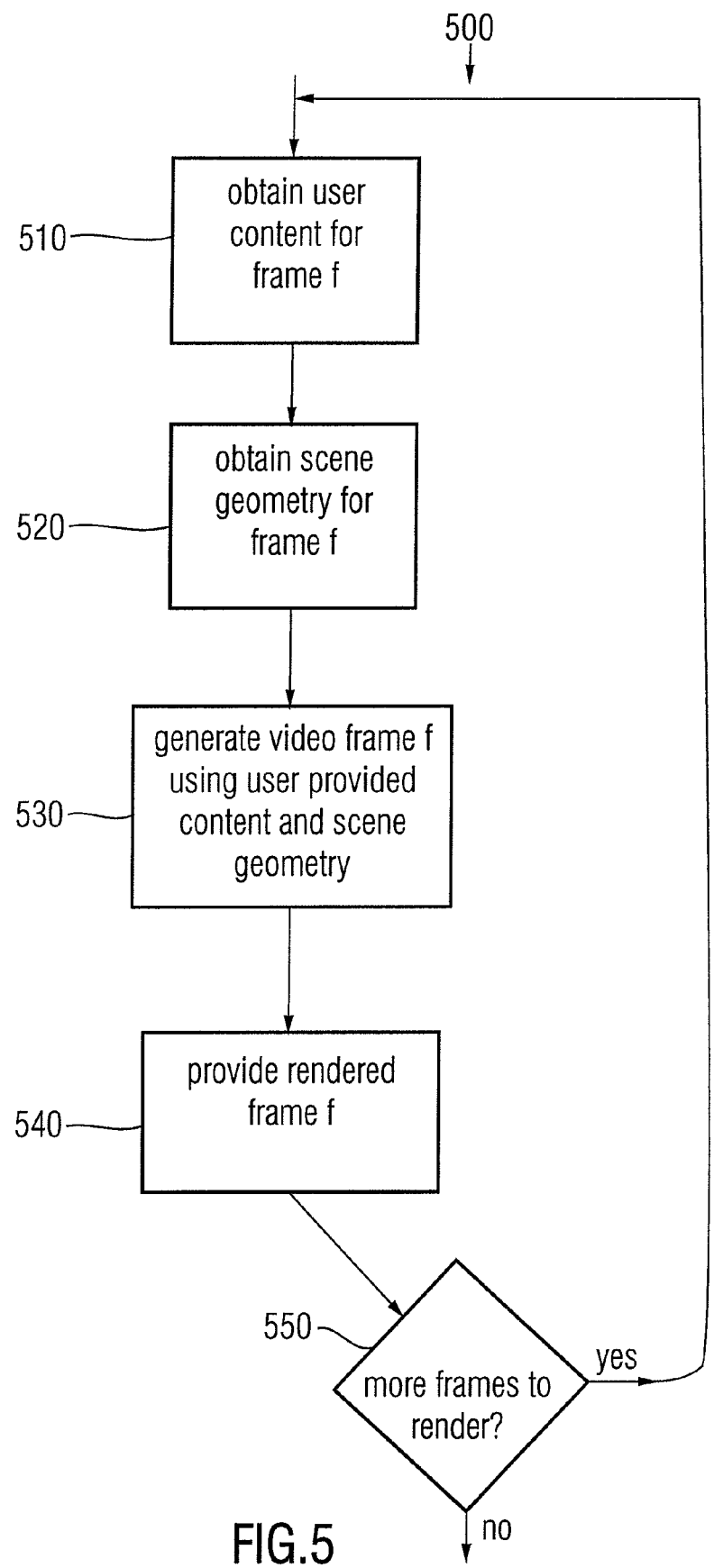
FIG. 5 shows a flowchart of a method for rendering a frame on the basis of a scene model and user-provided content.

FIG. 5 shows a block schematic diagram of a method for rendering a video frame, which may be applied by the video frame generator 110. The method of FIG. 5 is designated in its entirety with 500. It should be noted that the method 500 of FIG. 5 may be executed multiple times for multiple frames to generate a sequence of video frames.

The method 500 comprises, in a first step 510, obtaining a user content for a video frame, the video frame having an index f for the sake of explanation.

The method 500 further comprises, in a second step 520, obtaining a scene geometry for the video frame f.

The method 500 further comprises, in a third step 530, generating the video frame f using the user-provided content (for the video frame f) and the scene geometry (for the video frame f).

The method 500 further comprises, in a fourth step 540, providing a rendered video frame f.

If it is found in a decision step 550 that there are more frames to be rendered, steps 510, 520, 530, 540 are repeated.

The first step 510 of obtaining the user content for the frame f comprises determining which user content is to be used for the frame f. If, for example, it is found that all frames of a sequence of video frames to be rendered make use of the same (steady) user-provided content, the user-provided content obtained for a previously processed video frame may be reused. If, however, it is found that different user-provided contents should be used for different frames of the generated (or rendered) sequence of video frames, an associated user-provided content is obtained.

If, for example, the user-provided content is a sequence of video frames, the different frames of the user-provided sequence of video frames may be associated with different frames of the generated (or rendered) sequence of video frames. Thus, in step 510, it is identified which frame of a user-provided sequence of video frames should be used for a generation of the presently rendered video frame.

It should be noted here that for the generation of a single generated (or rendered) video frame one or more user-provided video frames may be used. For example, it is possible to have within a single generated (or rendered) video frame a corresponding video frame of a first user-provided sequence of video frames and a corresponding frame of a second user-provided sequence of video frames. An example of video frames used is shown with reference to FIG. 7.

In the second step 520 a scene geometry for the presently processed frame f is obtained. The scene geometry may, for example, be given in the form of a description language characterizing geometrical objects which are present in the respective frame. For example, the scene geometry for a frame f may be described in a description language similar to the listing 300 of FIG. 3. In other words, the scene description may comprise a list of geometrical shapes or elements to be displayed in the respective frame, along with a plurality of attributes or properties associated with the geometrical objects or shapes. Such characteristics may, for example, comprise a position and/or orientation of the objects, a size of the objects, a name of the objects, a material of the objects, a texture to be associated with an object or with individual surfaces of the object, a transparency of the object and so on. It should be noted here that any properties may be used for the geometrical objects or geometrical shapes which are known from the description of virtual reality worlds.

Furthermore, the scene geometry may comprise information about an observer or an observation point, defining a point of view scene from which an image of the scene described by the scene geometry should be generated. The description of the observation point and/or the observer may comprise a position of the observation point, a direction of observation and a view angle.

It should be noted here that the scene geometry for the frame f may be directly taken from a scene model which is available for the frame f. Alternatively, the scene geometry for the frame f may be obtained using a scene model for a frame e, which has been displayed before the frame f, and exploiting information about a movement of objects during the time between the frame e and the frame f. Also, information about a movement of the observation point, the direction of observation or the viewing angle may be evaluated to obtain the scene geometry for the frame f. Thus, the scene geometry for the frame f is a description of geometrical objects and/or geometrical shapes to be displayed in the frame f.

In the third step 530, a video frame f is generated using the user-provided content and the scene geometry obtained in the second step 520. Details of the generation of the video frame f will subsequently be described as a reference to FIG. 6. In the third step 530 a rendered video frame is obtained on the basis of the user content for the frame f and the scene geometry for the frame f.

Consequently, in the fourth step 540, the rendered frame f is provided for a further processing, e.g. for forming a sequence of frames or for performing further encoding of the source material of the frame or the sequence of frames.

Figure 6:
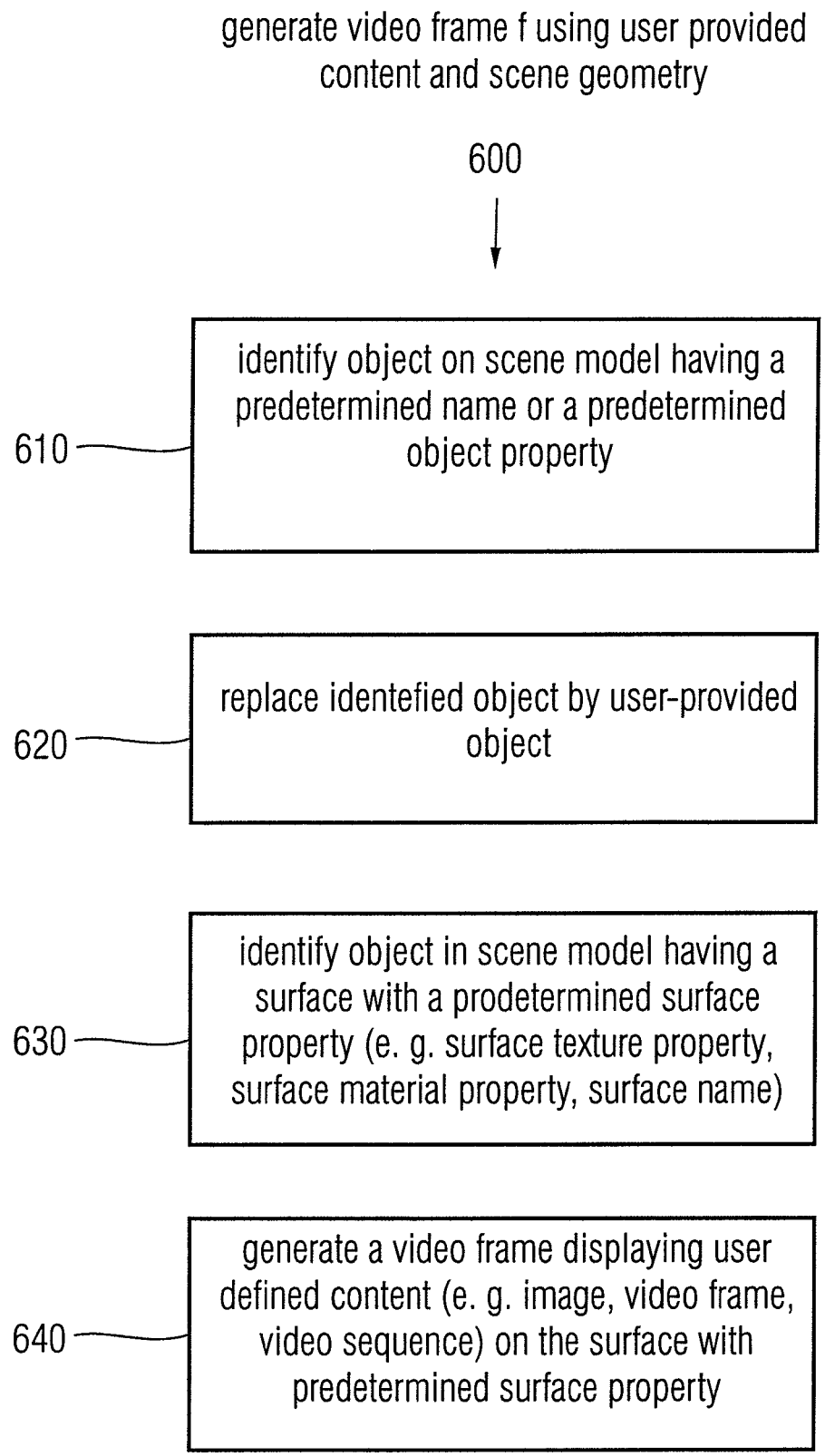
FIG. 6 shows a flowchart of a method for generating a particular video frame using a user-provided content and a scene geometry.

FIG. 6 shows a block schematic diagram describing a generation of a video frame f using user-provided content and the scene geometry. The method of FIG. 6 is designated in its entirety with 600.

The generation of the video frame f comprises a first step 610 of identifying an object in the scene model for the video frame f having a predetermined name or a predetermined object property. If such an object can be identified in the first step 610, the identified object is replaced by a user-provided object in a second step 620. In a third step 630, an object is identified in the scene model which has a surface with a predetermined surface property. The predetermined surface property can, for example, be a surface texture property, a surface material property or a surface name property. However, it may also be recognized that if an object with a predetermined name is present in the scene model, and in this case it may automatically be assumed that at least one particular surface of the object has the predetermined surface property. For example, it may be defined that if the scene model comprises a cube having a predetermined name (e.g. video_object or NSG_Mov, where Mov stands for movie) the surfaces of the respective cube have the predetermined surface property of being adapted to show a video thereon.

In other words, it is the key objective of the third step 630 to identify at least one surface adapted to display a user-provided content thereon, or to identify at least one object having a property indicating that it is intended to display a user-provided content on a surface thereof.

If a surface being intended to display the user-provided content is identified, the user-provided content is displayed on the respective surface. In order to reach this effect, the video frame generator may use the user-provided content as a texture for the surface for which it was recognized that it is intended to display the user-provided content thereon.

For example, the video frame generator may parse the scene description or the scene model for the frame f to identify at least one surface being intended to display the user-provided content. For example, the video frame generator may insert into the scene model a reference (e.g. a link) indicating to apply the user-provided content as a texture for the particular surface. In other words, the video frame generator may parse the scene model or scene description to identify a characteristic name or a characteristic property of an object or surface, and set a texture property of the identified object or surface to designate the user-provided content as the texture to be applied.

For the parsing, the video frame generator may, for example, obey a predetermined parsing rule, for example defining that a surface having a predetermined surface name or surface property should be filled with a texture based on a user-provided content.

Alternatively, the parsing rule may also indicate that a predetermined, i-th surface of an object having a predetermined name should be given a texture based on the user-provided content.

If a surface is identified in the scene model or the scene description which is intended to have a texture based on the user-provided content, the video frame generator 110 consequently displays the user-provided content on the identified surface. For this purpose, a graphical representation of the scene described by the scene model or the scene description is generated. The objects described in the scene model or the scene description in terms of their properties (like position, size, orientation, color, material, texture, transparency) are translated into graphical representations of the objects, taking into consideration the relative position of the objects with respect to each other and with respect to the point of observation. In other words, the arrangement of objects as described by, the scene model or the scene description is translated into a graphical representation as seen from the point of observation. In the generation of the graphical representation, a replacement of objects in the second step 620 is taken into account, as well as the fact that the user-provided content is a texture of the identified surfaces intended to have such texture.

It should be noted here that the generation of a graphical representation of a scene described by a scene model or a scene description is known to the artist/designer.

It should further be noted that it is not necessary to execute all the steps 610, 620, 630, 640. In contrast, in an embodiment it may be sufficient to perform steps 610 and (if step 610 is successful) step 620. In this case, the video frame generator 110 generates a video frame displaying the scene as described by the scene model, wherein the identified object is replaced by the user-provided object according to the second step 620. Finally, step 640 is executed to generate a graphical representation.

However, it is not necessary to execute the first step 610 and the second step 620 if, for example, it is not necessary to replace any objects. In this case, it may be sufficient to execute the step 630 of identifying a surface in the scene model on which the user-provided content should be displayed (e.g. as a texture). After the step 630, the fourth step 640 is executed. In the step 640 the video frame generator 110 generates a video frame displaying the user-defined content on the identified surface.

In other words, it is possible to execute the replacement of an identified object by a user-provided object (steps 610 and 620) only, to execute the replacement of a texture of a surface by a user-defined object (step 630) only, or to execute both a replacement of an identified object by a user-provided object (steps 610 and 620) and a replacement of a texture of a surface with a user-provided object (step 630).

Figure 7:
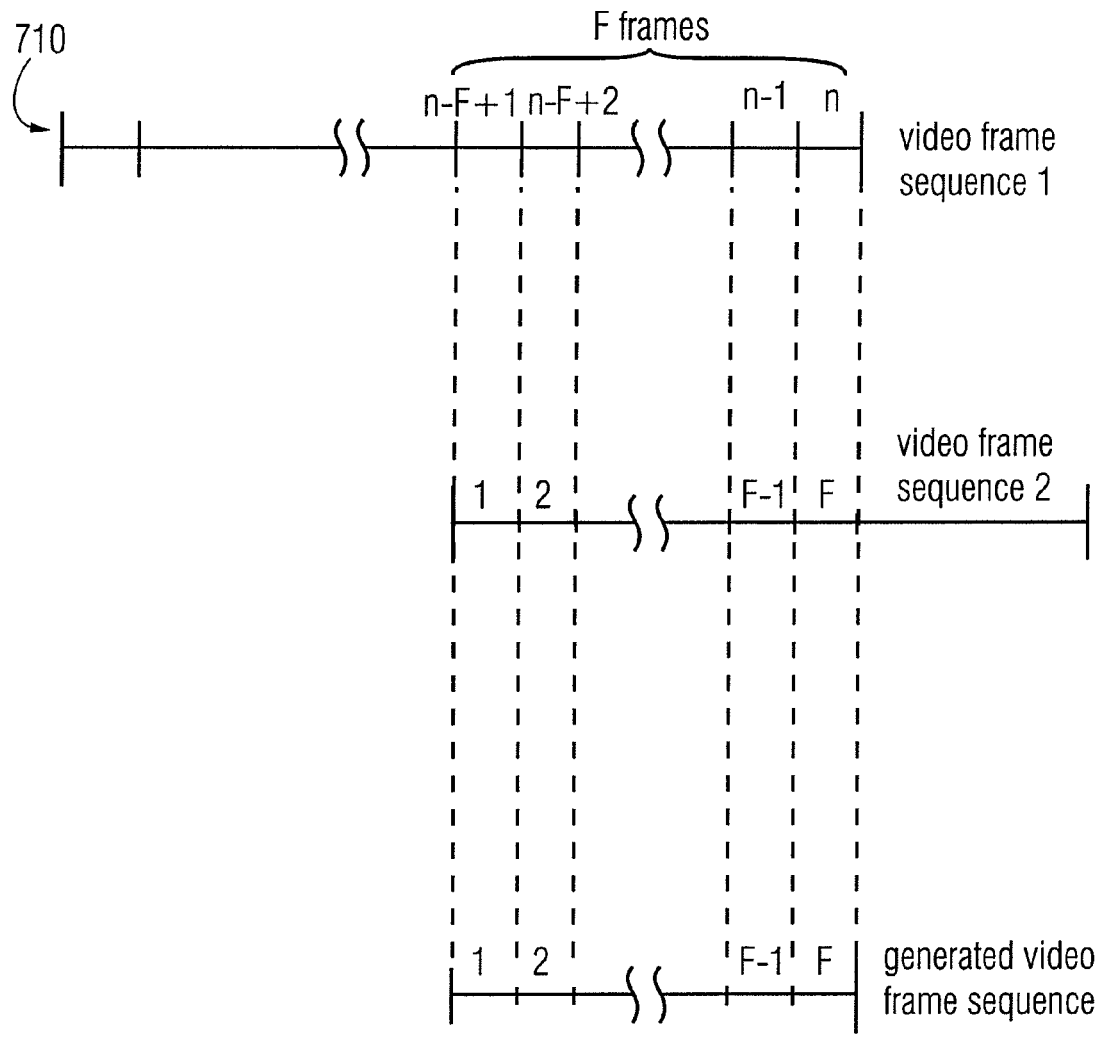
FIG. 7 shows a graphical representation of the usage of frames of a first video frame sequence and a second video frame sequence in the generation of a generated video frame sequence.

FIG. 7 shows a graphical representation of video frames of two user-provided sequences of video frames for the generation of a transition between the first user-provided sequence of video frames and the second user-provided sequence of video frames. It is assumed here that the transition comprises a time interval, during which both the content of the first user-provided sequence of video frames and of the second user-provided sequence of video frames is displayed in the generated sequence 116 of a video frame.

For this purpose, a user may define an overlap region. In other words, the overlap region may, for example, comprise F frames (which correspond to a certain time duration). Thus, the last F frames of the first user-provided sequence of video frames are used in the transition. The frames of the first user-provided sequence of video frames are shown in a first graphical representation 710 of FIG. 7, wherein the last F frames of the first user-provided sequence of video frames have indices (n−F+1) to n. It is assumed here that the last F frames of the first user-provided sequence of video frames are used for the transition. However, it is not necessary to use the last F frames. Rather, it would be possible to use F frames which are arranged within the first user-provided sequence of video frames.

Moreover, it is assumed here that the first F frames of a second user-provided sequence of video frames are used for the generation of the generated sequence of video frames.

It is further assumed that the generated sequence of video frames comprises F video frames having indices 1–F. Thus, a frame having index n−F+1 of the first user-provided sequence of video frames and a frame having index 1 of the second user-provided sequence of video frames are associated to a first frame of the generated sequence of video frames. Thus, the associated video frames are used for the generation of the first generated sequence of video frames. In other words, for the calculation of the first frame of the generated sequence of video frames, the (n−F+1)-th frame of the first user-provided sequence of video frames and the first frame of the second user-provided sequence of video frames are applied.

In contrast, the n-th frame of the first user-provided sequence of video frames and the F-th frame of the second user-provided sequence of video frames are associated to the F-th frame of the generated sequence of video frames.

It should be noted here that an association between a frame of a user-provided video sequence and a frame of the generated sequence of video frames does not automatically mean that the associated frames are necessitated for the calculation of the particular frame of the generated sequence of video frames. However, if during the process of rendering a f-th frame of the generated sequence of video frames it is found that a frame of the first user-provided sequence of video frames and/or of the second user-provided sequence of video frames is necessitated, then the associated frame is used.

In other words, the above-described association between frames of the first user-provided sequence of video frames, the second user-provided sequence of video frames and the generated sequence of video frames allows for an efficient calculation of the generated sequence of video frames, wherein variable (or moving) user-provided contents can be embedded into the generated video frame sequence.

In other words, the frames of the first user-provided sequence of video frames serve as a frame-variant texture of a surface intended (or identified) to display the first user-provided sequence of video frames.

The frames of the second user-provided sequence of video frames constitute a frame-variant texture of a surface intended (or identified) to display the second user-provided sequence of video frames.

Thus, the generated video sequence is provided using a frame-variant texture.

It should further be noted that for the calculation of the generated video frame sequence the first user-provided sequence of video frames and/or the second user-provided sequence of video frames may be shifted with respect to the generated sequence of video frames. Also, the first user-provided sequence of video frames may be extended or compressed with respect to time. The same holds for the second user-provided sequence of video frames. It is merely necessitated that one frame of the first user-provided sequence of video frames and one frame of the second user-provided sequence of video frames is associated with each frame of the generated sequence of video frames in which those user-provided contents are used.

Figure 8:
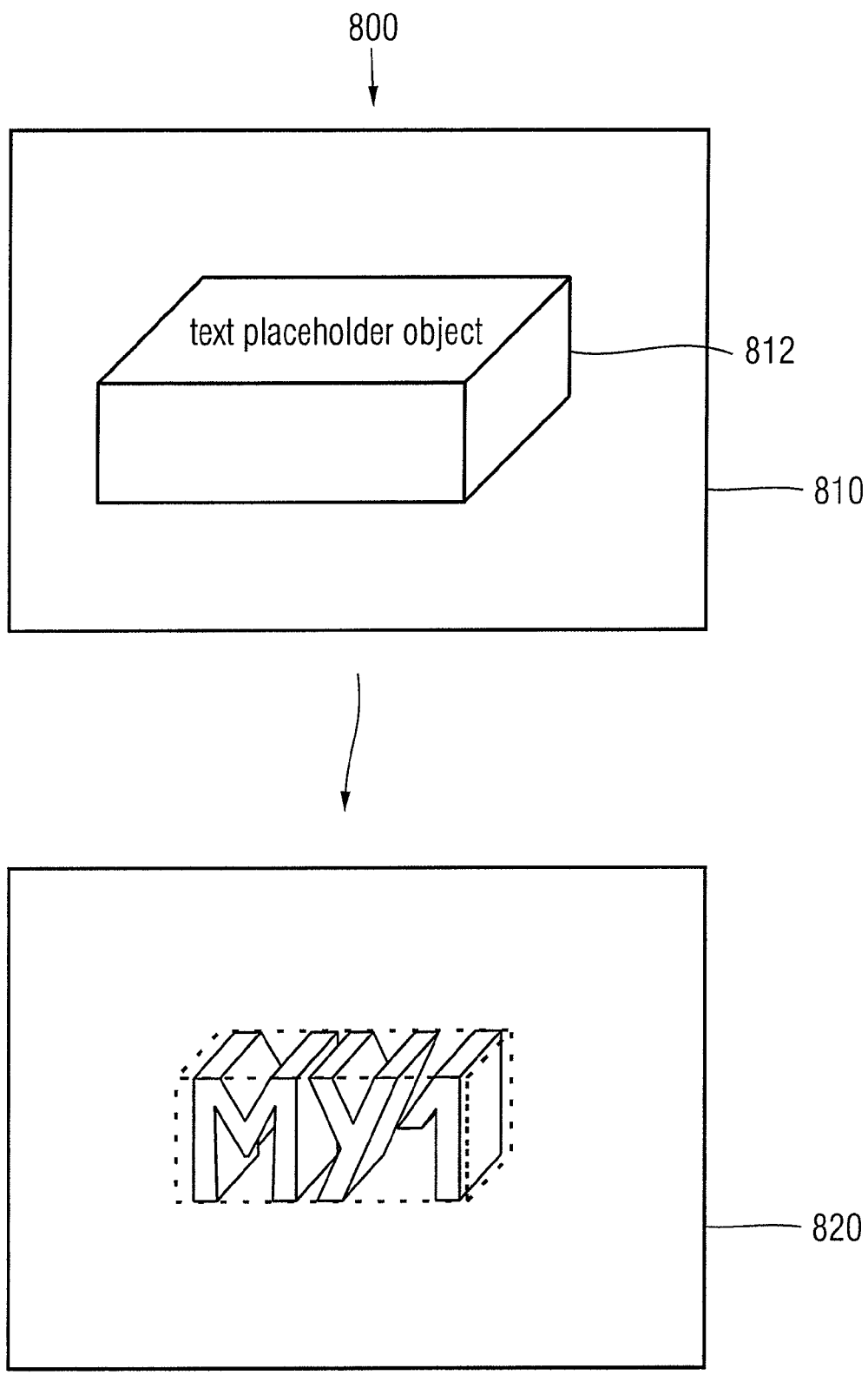
FIG. 8 shows a graphical representation of a replacement of a place-holder object by a three-dimensional text object.

FIG. 8 shows a graphical representation of a replacement of a text place-holder object by a text.

The graphical representation of FIG. 8 is designated in its entirety with 800. As can be seen from the graphical representation 800, a scene description 810 (represented here in the form of a video frame) may comprise a text place-holder object. For example, the scene description 810 may describe a cube or cuboid having a name or property indicating that the cube or cuboid is a text place-holder object. Thus, if the video frame generator 110 recognizes that the scene model 112 comprises a scene model object having a predetermined name or a predetermined object property indicating that the scene model object is a text place-holder object, the video frame generator replaces the text place-holder object by a representation of a text. For example, the video frame generator 110 may replace the text place-holder object by one or more objects representing a user-provided text. In other words, the video frame generator may introduce into the scene model a description of objects representing the user-provided text. The scene model generator may, for example, be adapted to receive the text in the form of a string input, and to generate the objects representing the text of the string input. Alternatively, the video frame generator may receive a description of the user-provided text in the form of one or more objects, the shapes of which represent the text. In this case, the video frame generator may, for example, be adapted to include the user-provided description of the text (in the form of a description of a plurality of objects) into the scene model and to generate the video frame on the basis of the scene model comprising the description of the objects representing the text.

As can be seen from FIG. 8, the video frame generator 110 generates the video frame 820 containing a graphical representation of the user-provided text. It should be noted here that in an embodiment the size of the graphical representation of the user-provided text is adapted to a size of the text place-holder object 812. For example, the text place-holder object may be used as an outer boundary of the user-provided text. Also, properties (e.g. a color property or a transparency property) associated with the text place-holder object 812 may be applied to the user-provided text, independent of whether the user-provided text is provided as a string or as a plurality of objects.

Thus, the scene model 112 serves as a template, defining the appearance of the user-provided text in the sequence 116 of video frames.

In the following, the present invention will further be described. Also, the application of the present invention for the generation of menu structures of video data media will be described. Moreover, it will be described how a transition between different video contents can be generated on the basis of the inventive idea. Further, it will be described how video effects and text effects can be generated.

In the following, some general information about DVD menus, video transitions, video effects and text effects will be given. To begin with, video transitions, video effects and text effects will be described.

Although the key application of the present invention is the creation of three-dimensional (3D) DVD menus, three-dimensional video transitions, and three-dimensional video effects as well as three-dimensional text effects will be described. Three-dimensional video transitions, three-dimensional video effects and three-dimensional text effects may be considered to be more simple versions of the more complex DVD authoring.

A video transition is typically inserted when two video sequences (or video movies) are combined or linked in order to avoid an abrupt transition. A very simple two-dimensional (2D) video transition would, for example, be fading to black a first video and, subsequently, inversely fading the second video. In general, a video transition is a sequence of video frames (or a movie sequence) which at the beginning shows a frame identical to the first video, and which at the end shows a frame identical to the second video. This sequence (of video frames) is then cut (or inserted) between the two videos and thus allows for a continuous (or smooth) transition between the two videos.

For a three-dimensional video transition, the sequence of video frames (or movie sequence) is a product of a rendering of a three-dimensional scene. Also, in the case of a three-dimensional video transition, the first frame of the sequence is advantageously identical to a frame of the first video, and the last frame of the sequence is advantageously identical to a frame of the second video. Apart from the 3D scene and an animation thereof, a rendering engine receives as an input simultaneous frames of the first video and the second video. One can imagine the process (of generating the transition) by assuming that the two videos are put on top of each other in an overlapping way, and that the overlap region defines a length of a video transition and is replaced by the rendered scene. A simple example of a three-dimensional video transition could be a plane, with the first video visible on the front face and the second video visible on the back face. The plane then has to move in such a way, that the front face is visible fullscreen at the beginning of the animation (or transition) and the back face is visible fullscreen at the end. For example, the plane could move away from a camera (or an observer, or an observation point), perform half a rotation around a horizontal axis of symmetry, and move towards the camera again.

Three-dimensional video effects and three-dimensional text effects are generally three-dimensional objects which are added to a video movie (or a sequence of video frames). In this case, the 3D scene and the animation thereof are input for the rendering engine, as well as the frames of the original video (or starting video).

For text effects, a text string is determined (or set). An example of a three-dimensional text effect can be imagined as a sequence (e.g. a sequence of video frames), wherein the string builds up, rendered as three-dimensional text characters for the characters, and later disappears again. The original video (or starting video) in this case continues to run in the background.

A three-dimensional video effect may, for example, be a three-dimensional object flying into the frame, and flying away again later (e.g. a pacifier for a baby movie, or a football for a soccer world championship movie).

If the 3D video transitions, 3D video effects and 3D text effects are for example united. The rendering engine receives as an input a 3D scene as well as simultaneous frames from one or more videos and (optionally) one or more text strings. The rendering engine then generates a short movie frame by frame, wherein the movie is afterwards further processed by an external unit (e.g. combined or cut together with further video material).

The three-dimensional scenes may be available (or may be given) either in a proprietary data format or in a generic data format which may be a standard export data format of generally any 3D modeling software. In principle, an import of arbitrary 3D data formats (i.e. data formats describing a three-dimensional scene) is possible. The detailed structure of the data file format is irrelevant for the present invention.

Further, it is advantageous that it is possible to group geometric objects and to give names to groups, objects and/or surface definitions (wherein, for example, material is identical to a color and a texture: material=color+texture). In this way, it is, for example, possible to inform the rendering engine, by using a specific name (i.e. a characteristic or predetermined name) for the material on the front of the plane in the above example for a three-dimensional video transition, that the frames of the first video are to be placed (or shown) on that surface. In other words, a material of the front page of the plane is given a specific name (e.g. NSG_Mov). The specific name (NSG_Mov) indicates to the rendering engine that the frames of the first video are to be shown on the specific surface, i.e. on the front of the plane. In the same way, the rendering engine is instructed by a specific material name (e.g. NSG_MovI) to show on the back of the plane the frames of the second video.

In order to insert an end user editable text into the three-dimensional scenes, three-dimensional objects like cuboids are used, which are marked by specific (or characteristic) names as place-holders for three-dimensional text objects. The rendering engine can then remove these objects in advance (e.g. before generating a graphical representation of the three-dimensional scene) and render in their place a text defined by an end user. A size of the drawn three-dimensional text complies with (or depends on) the size of place-holder object.

In this way, a 3D modeler can create three-dimensional scenes which are interpreted by the smart3D engine as a video transition, text effect or video effect by means of giving names and grouping, wherein commercial tools (e.g. any program which is capable of exporting data in a 3D-description data format) may be used. The 3D modeler does not necessitate any programming knowledge. While there are only a small number of rules in the form of object names when considering (video-) transitions and (video-) effects, the creation of a functional DVD menu is more complex. However, the basic procedure remains the same.

In the following, the generation of DVD menus will be described. It should be noted here that most commercial DVDs contain, besides the main movie, additional video material, like the making-of or interviews with the actors. Besides, the main movie is often separated into chapters. In order to allow the end user of the DVD to navigate through the DVD, the DVD comprises further video sequences in addition to the above-described video material, wherein the additional video sequences are interpreted as a menu structure by the DVD player. The data format (or details of the data format) of a video DVD are defined in a specification, and the DVDs generated by the smart3D concept do not deviate from the specification.

A DVD menu may consist of a plurality of menu pages. A user can change between the pages by means of an action, like selecting a button. Also, the user can start a particular video or a particular chapter of a video by means of an action.

Between the displaying of two menu pages, between a menu page and a video, or between a black screen directly after inserting a DVD and a main menu page, small video sequences can be defined which, similar to video transitions, avoid an abrupt change. FIGS. 9, 10, 11, 12, 13, 14, 15, 16, and 17 show a schematical arrangement (or structure) of a DVD menu having inter-menu sequences. The inventive concept (also designated as smart3D) provides the possibility of defining menu pages and inter-menu sequences using three-dimensional models (also designated as scene models).

The DVD menu pages themselves are also short video sequences, so that even during a phase in which a DVD user (i.e. a person using the DVD) can make selections it is not necessary to display a purely static image. In contrast one or more animations may be running during the phase in which the DVD user can make selections. These movie sequences (i.e. the small animations) are rendered by a DVD authoring program using smart3D.

Thus, the generation of the sequences (e.g. of the video frame sequences) from the three-dimensional scenes (or on the basis of the three-dimensional scenes) is executed on a computer of a user of the authoring program or authoring software. The DVD player merely plays videos (contained on a DVD generated by the DVD authoring program) in a fixed order or according to actions of the DVD user.

Figure 9:
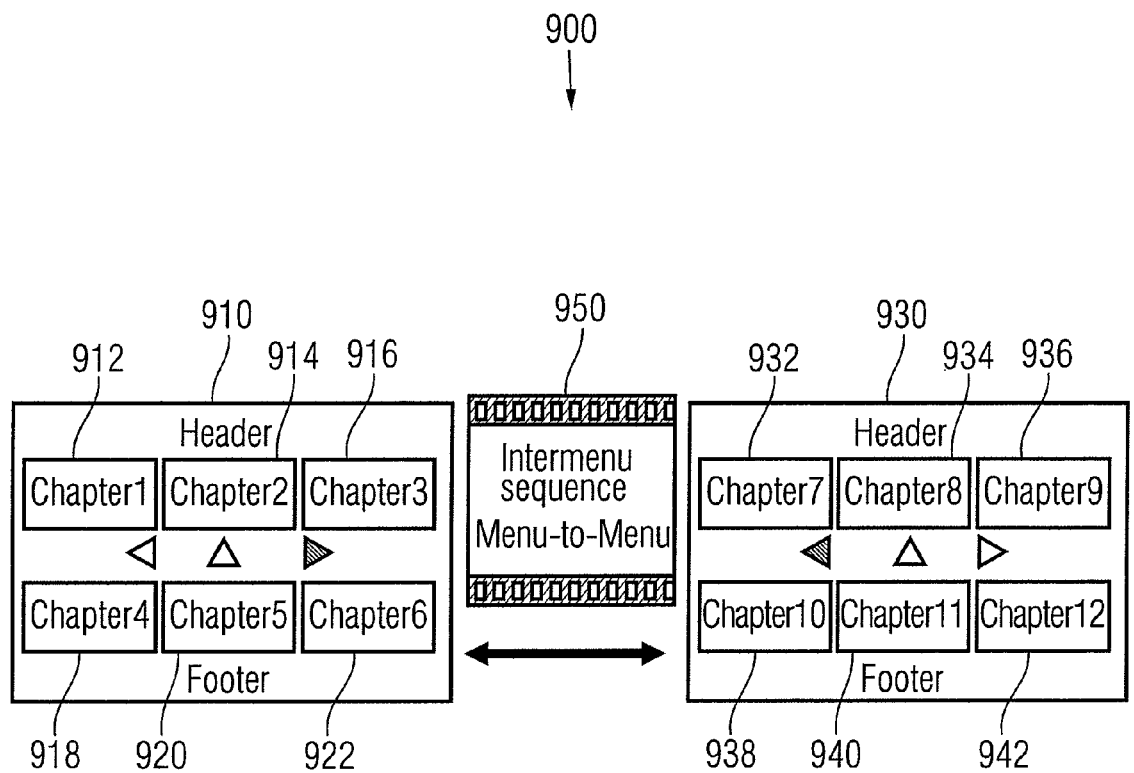
FIG. 9 shows a graphical representation of a sequence between two menu pages.

Typical transitions occurring on a video DVD medium will subsequently be described with reference to FIGS. 9, 10, 11 and 12. FIG. 9 shows a graphical representation of a sequence (e.g. a sequence of video frames) between two menu pages. The graphical representation of FIG. 9 is designated in its entirety with 900. FIG. 9 shows a first menu page 910. The first menu page of 910 comprises buttons 912, 914, 916, 918, 920, 922, which may be used to select a particular chapter of the DVD content contained on the video DVD medium. The buttons 912, 914, 916, 918, 920, 922 may be represented by one or more graphical objects. Also, the buttons 912, 914, 916, 918, 920, 922 may comprise a selectable region and/or a highlight region so that a cursor may be moved to highlight one of the buttons for selection. It should further be noted that the graphical representation of the buttons 912, 914, 916, 918, 920, 922 may comprise, as a user-provided content, a user-provided image, a user-provided video frame or a user-provided sequence of video frames. In other words, the graphical representation of the buttons may comprise a static or dynamic, i.e. alterable graphical content.

It should further be noted that the menu page 910 is advantageously described in terms of a scene model generated by a 3D modeler. Thus, elements (e.g. geometric objects) of the menu page 910 are described in the form of a scene description language. Additionally, the scene model of the menu page 910 may comprise place-holder objects or place-holder surfaces, such that place-holder objects can be replaced by user-provided objects (i.e. user-provided content), and such that place-holder surfaces can display (e.g. as a texture) user-provided content (e.g. a user-provided image, a user-provided video frame, or a user-provided sequence of video frames).

FIG. 9 shows a second menu page 930. The second menu page 930 comprises a plurality of buttons 932, 934, 936, 938, 940, 942. The buttons 932, 934, 936, 938, 940, 942 may have a similar appearance and functionality to the buttons 912, 914, 916, 918, 920, 922.

FIG. 9 further shows an inter-menu sequence or menu-to-menu sequence 950 to be played by the DVD player, when a transition between the first menu page 910 and the second menu page 930 is performed. The inter-menu sequence 950 lying between the first menu page 910 and the second menu page 930 (which is typically an animated scene or animation) advantageously takes care that the content of the old, previous (or previously displayed) menu disappears, and that the scenery (or content) of the new (subsequent or subsequently displayed) menu is built up. Depending on the structure of the menu, it is advantageous to display some navigation arrows (e.g. green arrows). It should be noted here that the menu structure as described with reference to FIG. 9 and is not an essential part of the invention, but should rather be considered to be an example. In other words, the present invention is not limited to a particular menu structure. The graphical representations of exemplary menus are merely intended to explain the problem of a dynamic menu creation. In this context, "dynamic" means that at the point in time when the menu is designed (i.e. for example the point in time when a menu template is created) the final appearance of the menus is unknown. For example, at the point in time when the menu is designed, the occupancy (or allocation) and the usage of the individual buttons (or active switching areas) and of optional additional (three-dimensional) objects is unknown.

Figure 10:
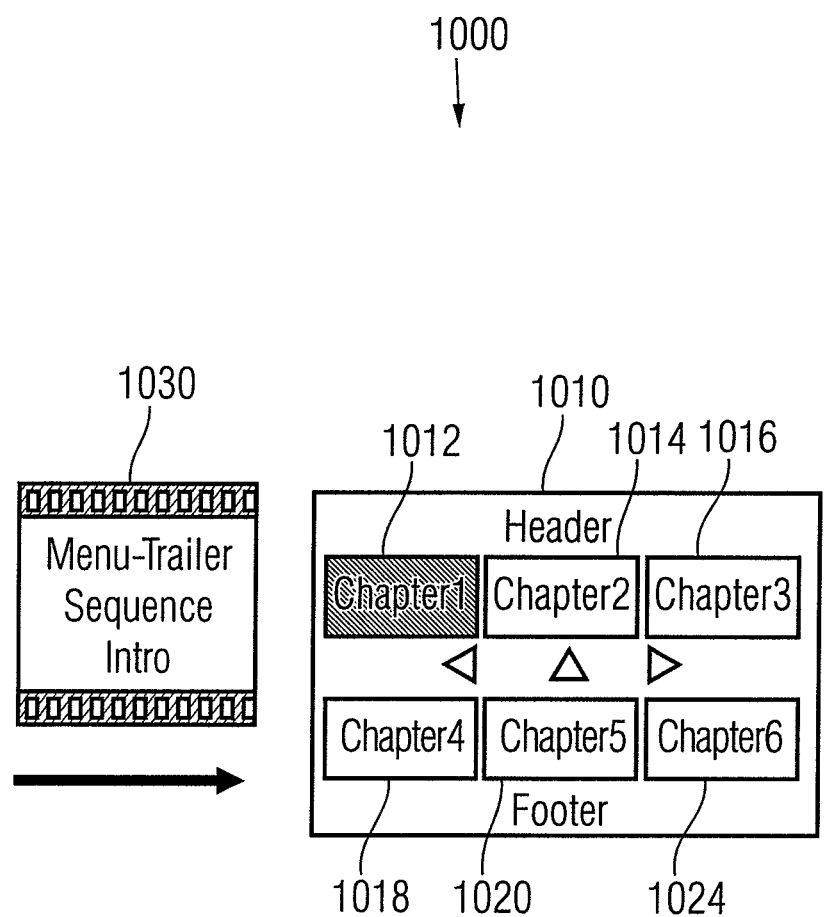
FIG. 10 shows a graphical representation of a schematically outlined progression of an introductory movie.

FIG. 10 shows a graphical representation of a schematically outlined course of the introductory movie. The graphical representation of FIG. 10 is designated in its entirety with 1000. The graphical representation 1000 shows a first menu page 1010 having a plurality of buttons 1012, 1014, 1016, 1018, 1020, 1022. For example, the first menu page 1010 may be identical to the menu page 910. The graphical representation 1000 further shows a menu trailer sequence 1030 (also designated as "intro"). The introductory movie ("intro") or trailer is played one time when the DVD is inserted into the DVD player. The introductory movie or trailer ends in the first main menu of the DVD.

In other words, the menu trailer 1030 is a sequence of video frames starting with a black screen and ending with the first main menu. Besides, it should be noted that the menu trailer sequence 1030 is advantageously described in terms of a scene model, as has already been outlined before.

Figure 11:
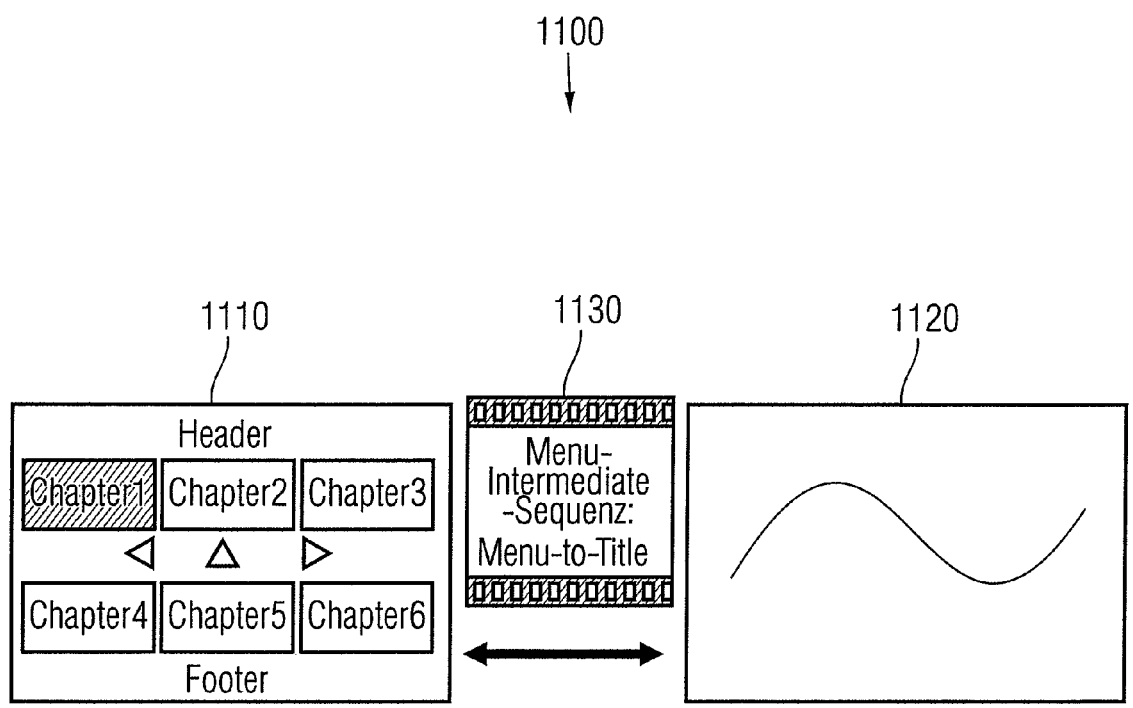
FIG. 11 shows a graphical representation of a schematically outlined animation of an intermediate sequence "chapter selection menu→movie start"

FIG. 11 shows a graphical representation of a schematically outlined animation of an intermediate sequence "chapter selection menu→movie start". The graphical representation of FIG. 11 is designated in its entirety with 1100 and shows a menu page 1110. The menu page 1110 may, for example, be identical with the menu page 910 of FIG. 9, the menu page 930 of FIG. 9 or the menu page 1010 of FIG. 10. The graphical representation of FIG. 11 further shows a first frame 1120 of a movie (i.e. a sequence of video frames). The graphical representation 1100 further shows a menu intermediate sequence or menu-to-title sequence 1130.

The menu intermediate sequence 1130 advantageously begins with a video frame showing the menu page 1110 and ends with a video frame identical to a first frame of the user-provided video 1120. It should be noted here that the menu intermediate sequence 1130 may, for example, be described in terms of a scene model, as outlined before.

In an alternative embodiment, the menu intermediate sequence may be integrated into the menu in a reverse direction. Thus, the menu intermediate sequence 1130 may be played when the video (a frame of which is shown as the frame 1120) is finished and when a backward transition is performed back to the main menu. In other words, a menu intermediate sequence for a transition from the title to the menu may be provided. The respective transition may begin with a frame (e.g. the last frame) of the sequence of video frames, and may end with the menu page 1110.

Figure 12:
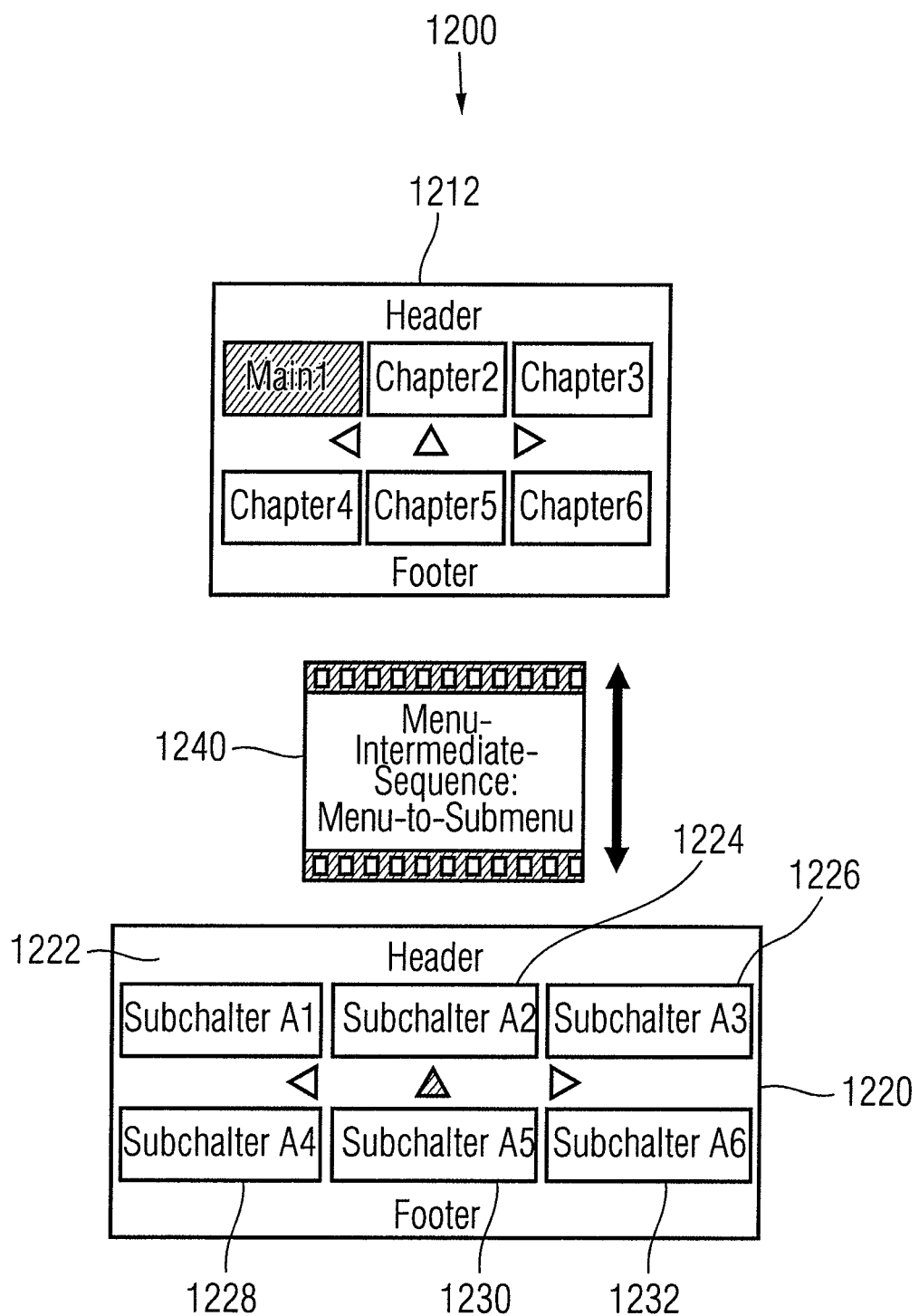
FIG. 12 shows a graphical representation of a sequence between a main menu and a submenu.

FIG. 12 shows a graphical representation of a sequence between a main menu and a submenu. The graphical representation of FIG. 12 is designated in its entirety with 1200. The graphical representation 1200 shows a main menu page 1212 and a submenu page 1220. The main menu page 1212 may, for example, be identical to the first menu page 910 or the second menu page 930 of FIG. 9, the menu page 1010 of FIG. 10 or the menu page 1110 of FIG. 11. The submenu page 1220 may have a structure which is similar or identical to the structure of the main menu page 1212. However, the submenu page 1220 may, for example, comprise buttons which allow the access to subchapters of a video on the DVD. Thus, the submenu page 1220 may comprise a plurality of buttons 1222, 1224, 1226, 1228, 1230, 1232. The graphical representation 1200 further shows a menu intermediate sequence or a menu-to-submenu sequence 1240.

In the case shown in FIG. 12, up to n=6 chapters may be present per menu (according to an exemplary embodiment). For a template of a typical menu intermediate sequence n*4+10 accordingly designated objects are advantageously provided by the designer (e.g. by the 3D modeler). Thus, if it is assumed that the maximum number of n=6 chapters may be present per menu page, 34 appropriately designated objects should be provided by the designer. In particular, the following objects should be provided for an exemplary menu-to-menu animation sequence:

n "old" chapter images
n "old" chapter texts
3 "old" navigation arrows
1 "old" header
1 "old" footer
n "new" chapter images
n "new" chapter texts
3 "new" navigation arrows
1 "new" header
1 "new" footer Closely linked with the above-mentioned objects, n "old" and n "new" corresponding groups are laid out in the three-dimensional scene correspondingly. The "old" and "new" groups define which objects belong a menu button. In an example "monitors", which is described in more detail below, a first chapter image, a first chapter text and the complete mechanics of a first monitor are summed up in the first group.

Thus, the 3D modeler can create a 3D menu by creating a series of animations using a commercial software, such that the animations obey the above-described rules. The 3D modeler does not need to have any programming knowledge. In addition, the user of the authoring program also does not need to have any knowledge about 3D modeling. The smart3D engine reads the 3D scenes (created by the 3D modeler), and creates short movie sequences from the 3D sequences and from the information which it obtains from the user of the DVD authoring program. The movie sequences constitute, together with the information about the menu structure, a dynamic DVD menu on the specification-compliant DVD.

In the following, it will be described how the smart3D engine processes the 3D scene together with the information from the authoring program in order to generate the menu intermediate sequences.

From the authoring program, different information is handed on to the smart3D engine. The user may want to integrate a different number of (main) videos into the DVD. The user can determine the video frames or video frame sequence for the button images in the 3D scene, the user can give the text of the header, the footer or the labeling of the buttons, and the user can select the color and transparency of the highlight mask. However, further information would also be possible, like the color of materials in the three-dimensional scene or a background image. In order to adapt the 3D scene respectively, the 3D scene is first translated into a separate data structure, the so-called scene graph.

Figure 13:
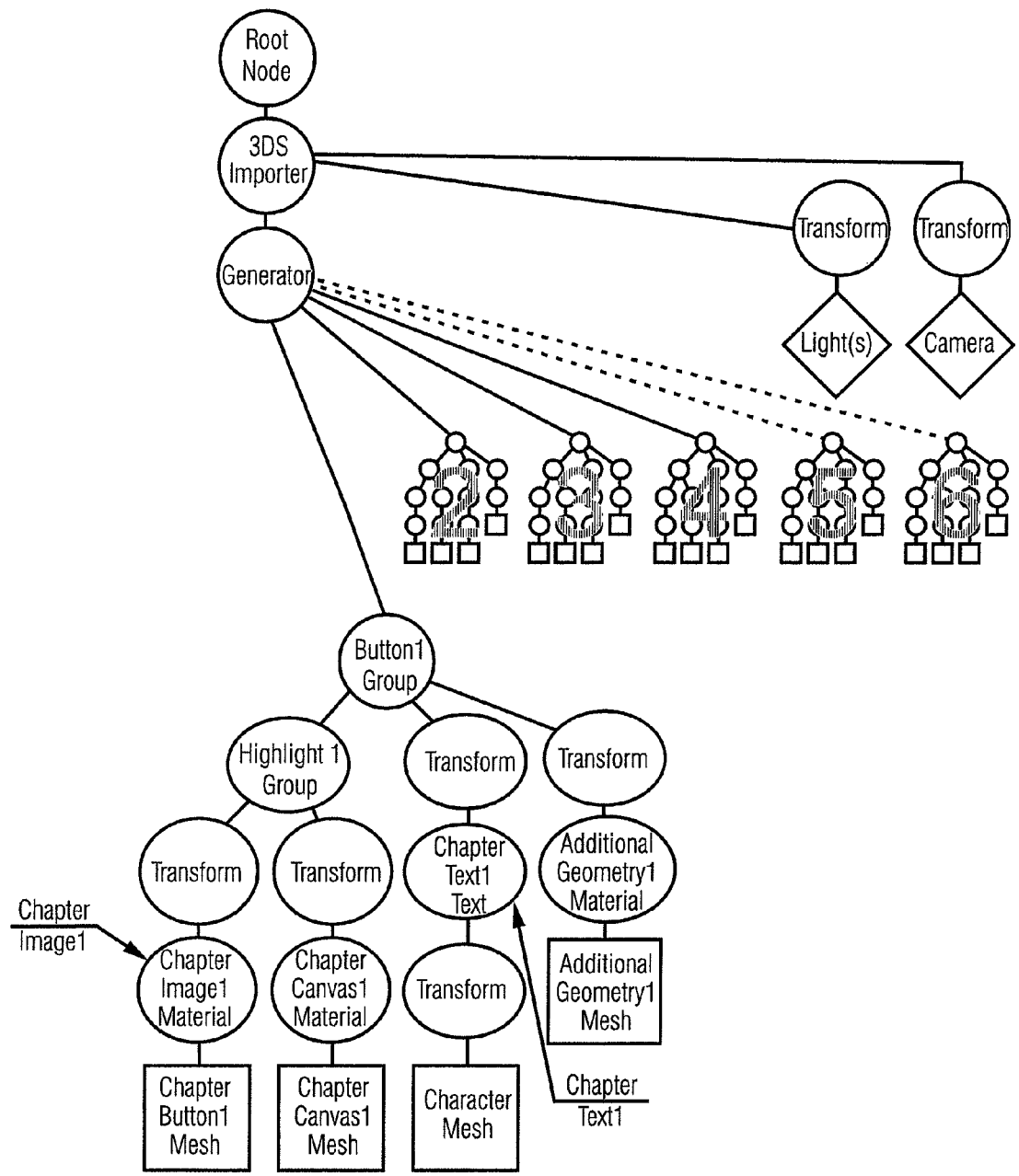
FIG. 13 shows a graphical representation of a smart3D scene graph having 6 chapter buttons.

FIG. 13 shows a graphical representation of a scene graph. During the rendering process, the scene graph is passed through and the geometry objects (rectangular nodes) are drawn according to the transformations and materials lying above (i.e. according to the materials and transformations lying on a higher level of the scene graph). The nodes designated with "group" in the scene tree (or scene graph) serve for grouping objects. Generators serve for animation of objects lying below.

When reading in and converting the 3D scene data into the internal data format, place-holder objects for text are translated into dynamic three-dimensional text objects on the fly. The 3D text objects are designated with "text" in the scene tree, and the three-dimensional text objects expect text strings as input values and generate the three-dimensional text in the rendered three-dimensional scene.

The data structure, which is consequently present in the memory, can be adapted according to the liking of the user of the authoring software before the actual rendering process.

If, for example, the user only includes (or links) 4 videos instead of 6 videos, only 4 video buttons are necessary, If the modeler has, for example, provided 6 three-dimensional objects for buttons, 2 buttons need to be masked or omitted. This is easily possible as the buttons can be identified by specific (or characteristic) names. Thus, the smart3D engine merely needs to leave out the respective branch in the scene tree during the rendering process. For the example given above (4 video buttons), the smart3D engine can leave out the branches designated with 5 and 6 in the scene graph of FIG. 13.

The frames of the video material (e.g. of the user-provided content), which should be attached or shown on the three-dimensional buttons, may be introduced (or identified, or linked) to the respective materials before rendering each menu-intermediate sequence frame. For example, an image to be shown on the first button (button 1) of the menu described by the scene graph of FIG. 13 is designated with "chapter image 1".

Thus, the user of the DVD generated using smart3D may navigate across the DVD by means of a 3D menu. Intermediate sequences are short video movies which are, for example, unchangeably laid down on the DVD. The user does not need any personal computer knowledge. The user of the DVD authoring program has previously determined the appearance of the DVD menu by entering title strings, by selecting video movies for integration or by fixing chapters. The smart3D engine generates from these entries or information (title strings entry; selection of video movies; selection of chapters; selection of images or selection of a sequence of video frames to be displayed on the buttons) and with the aid of animated three-dimensional scenes the video-intermediate-sequences. The user of the authoring software does not need any 3D knowledge or programming knowledge.

The 3D scene may be generated by a 3D modeler using standard software, wherein only a couple of rules have to be observed. The 3D modeler does not need any programming knowledge. An arbitrary number of three-dimensional menus, three-dimensional transitions and three-dimensional effects can be added without any change of a source code.

Figure 14:
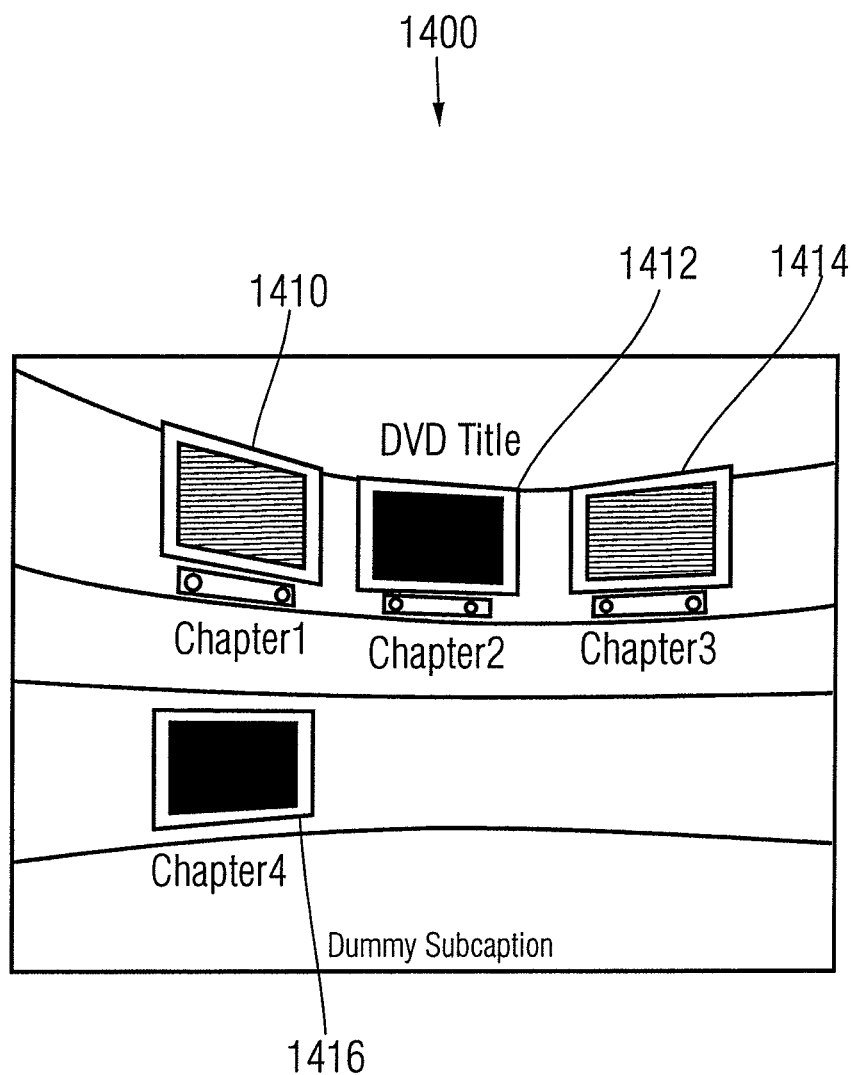
FIG. 14 shows a graphical representation of an example for a menu with 4 chapters.
Figure 15:
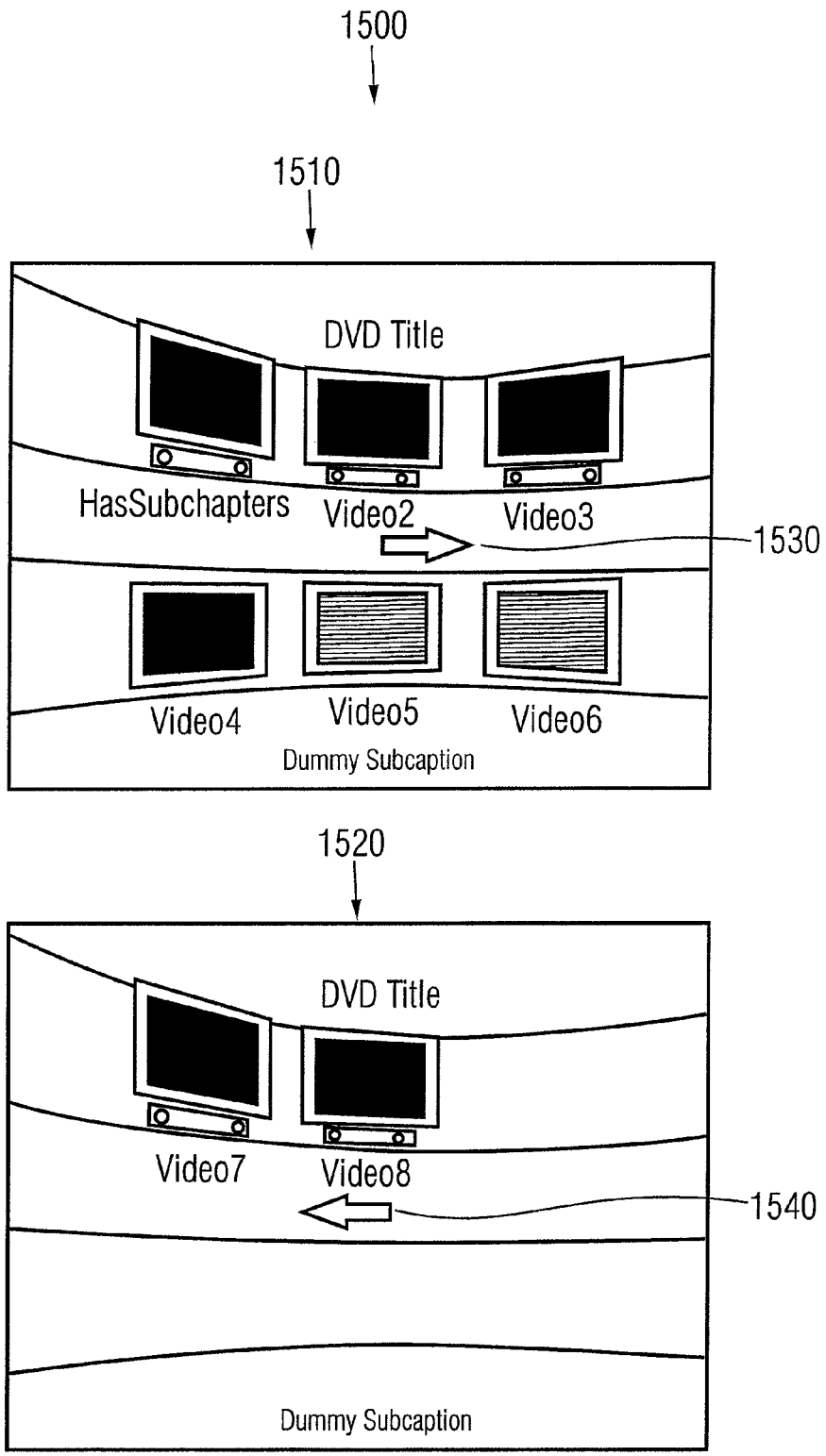
FIG. 15 shows a graphical representation of an example for a menu with 8 main chapters, wherein a user can navigate to a next and a previous menu page.
Figure 16:
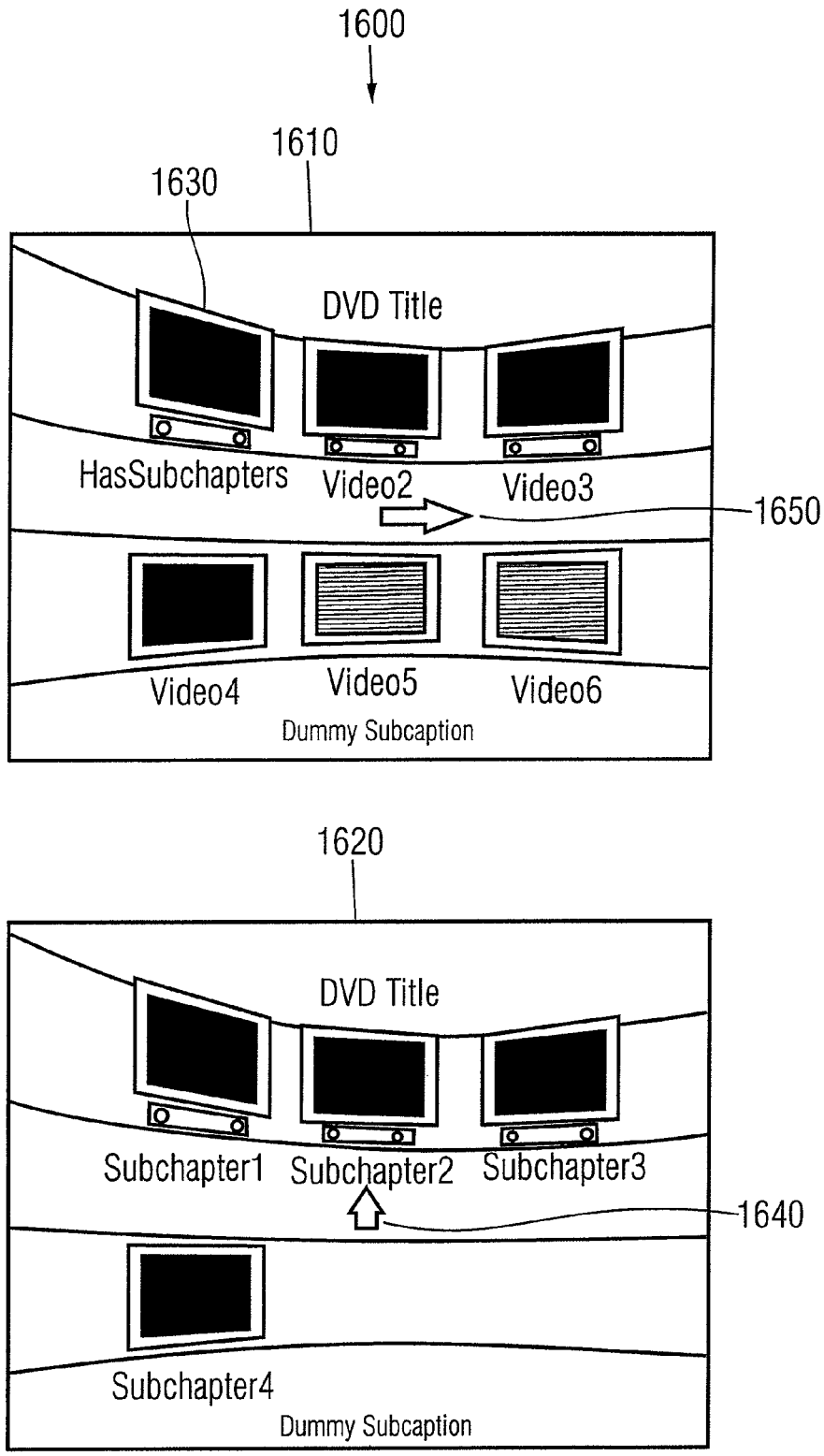
FIG. 16 shows a graphical representation of an example for a menu with 8 main chapters, wherein a first main chapter has 4 further subchapters, and wherein a user can navigate back to the main menu by selecting an "Up" button.
Figure 17:
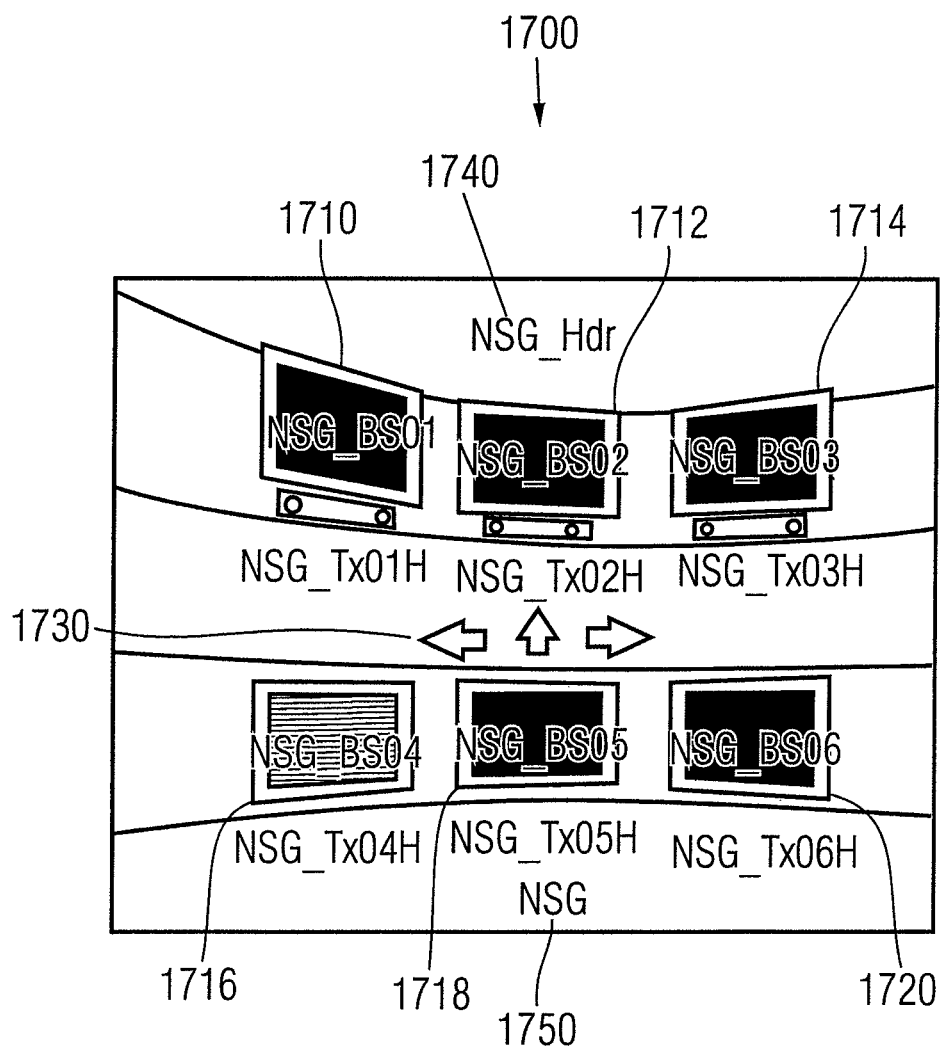
FIG. 17 shows a graphical representation of an example for a template of a main menu, on which the above examples are based, rendered in a smart3D internal representation.

It should be noted here that FIGS. 14, 15 and 16 show screen shots of an existing three-dimensional DVD menu when they are in use. FIG. 17 shows a template of a three-dimensional menu, as defined by the 3D modeler.

Inserting chapter objects consists of an image area and a video frame (or video image) for the chapter image, the chapter text and optionally additional model objects (in the example shown below entitled "monitors" and, for example, a movement mechanics of the monitors).

If the selectable region (or highlight region) consists of a plurality of objects, the objects can be summed up in a correspondingly named group. A bounding box of an area taken up by the group objects on the screen automatically defines a region actively selectable by the mouse (or a cursor).

In the following, it will be described how menu pages and transitions between menu pages can be created. It should be noted here that a 3D modeler is assumed to generate a scene model (or scene description) of a scene. The scene model describes, e.g. in terms of a three-dimensional modeling language, a scene which is subsequently supplemented with user-provided content and then translated into a sequence of video frames. In other words, the scene model comprises a description of the scene in terms of objects and object properties, a description of a temporal development of the scene model (e.g. a motion of the objects and/or a motion of the observer or of the observation point) and a description of place-holder objects or place-holder surfaces for the embedding of the user-provided content.

In the following, it is assumed that the modeler is a person or apparatus creating a scene model of a (advantageously three-dimensional) scene.

For the creation of 3D (three-dimensional) scenes which can be used in a DVD menu, the modeler has to obey a set of rules. Some of these rules are given by the logical structure or logical composition of the DVD menu. Other rules are necessitated in order to inform the smart3D engine about additional properties of a three-dimensional object, like, for example, the property to be a button, or the property to be used for a calculation of a highlight mask. The highlight mask is visible in a selection phase, when a menu page is displayed, and identified with a selected button by overlaying the selected button with a color defined by the user of the authoring program. With respect to the definition of the rules, it is necessary to describe in more detail the menu structure supported by the smart3D concept, as shown with respect to FIGS. 9, 10, 11 and 12.

The smart3D menu may be built up from a main menu and a plurality of submenus. On a main menu page, up to 6 buttons can be placed. The buttons are advantageously laid out by the 3D modeler, and are given specific (or characteristic) names. For example, the six buttons may be given the names "NSG_BS01" to "NSG_BS06". If more buttons are necessitated, for example because 10 videos are to be burned on a DVD during the process of DVD authoring, additional menu pages may be added; between which a navigation in a horizontal direction may be performed by means of left/right arrow buttons. In the case that chapter marks are additionally inserted into the videos in the process of DVD authoring, one or more menu pages of a submenu are added. By means of an up button one can get back again to a higher-level (lying above) page of the menu. The arrow buttons are advantageously also laid down in the 3D scene and are identified by names (e.g.: NSG_Up, NSG_Nxt, NSG_Pre).

In addition to the elements mentioned above, a labeling of the buttons, a header text and a footer text are supported in an embodiment of the invention. For this purpose, the 3D modeler adds place-holder objects with designating names, like the ones used in text effects, to the 3D scene. For practical reasons, cuboids are advantageous (for example: NSG_Hdr, NSG_Ftr).

Figure 23:
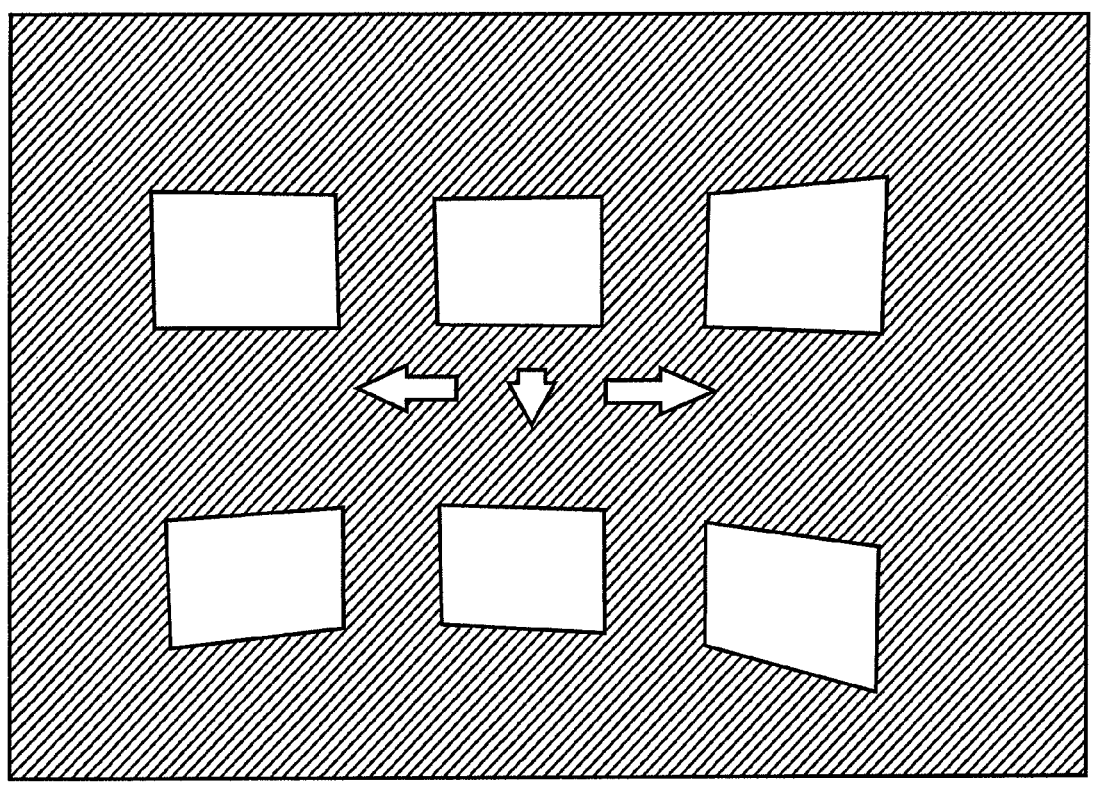
FIG. 23 shows a graphical representation of a highlight mask of the "Monitors" menu, comprising six buttons and three navigation keys (arrows)

A further naming and grouping of three-dimensional objects determines which objects should be taken into consideration for a calculation of a highlight mask. The calculation of the highlight mask then provides a silhouette of these objects as a black and white image. An example of a highlight mask for six menu buttons and three navigation arrows is shown in FIG. 23.

A respective grouping furthermore allows for a precise addition (or definition) of the highlight region, e.g. a definition of objects to be highlighted by color in response to a user-defined selection of a chapter. Typically, this region (i.e. the highlight region) is identical with the area on which the respective chapter image is located.

In the following, a calculation of a highlight mask will briefly be discussed. For this purpose, FIG. 23 shows a graphical representation of a highlight mask for menu structure as shown in FIG. 17.

The generation of the highlight mask is performed as follows: only objects having a specific (highlight mask) name (or belonging to a specific group of objects) are drawn in full-bright white in front of a black background.

This results in a silhouette of the highlight objects, which is superposed, in extracts, with the rendered main menu video in order to highlight a specific object (e.g. a button).

Apart from a labeling of the buttons, an image (or video frame) attached or displayed somewhere on the button facilitates for a DVD user an association between the button and the video. The image is typically a frame or a short movie sequence (a sequence of video frames) from the associated video or video chapter. The 3D modeler determines within the three-dimensional scene by means of a place-holder texture how and where the image is attached (or shown). For this purpose, the 3D modeler gives an identifying name to the respective material (e.g. NSG_BS01 to NSG_BS06).

Further boundary conditions for the 3D modeler arise from the logical structure of the 3D model. Thus, an introductory animation (as, for example, shown with reference to FIG. 10) advantageously starts with a black image and ends in a menu page. A menu-to-menu animation (or menu-to-menu transition) and a menu-to-submenu animation or a submenu-to-menu animation starts with a menu page (or a submenu page) and ends with a menu page (or a submenu page). A menu-to-video animation begins with a menu page and ends with the respective video in a full screen size. The animation, which is shown during the selection phase (i.e. during the time when a menu page is shown and the user can make a selection) may introduce only a minor movement into the menu, as otherwise a step (or a discontinuity) is perceived e.g. at the beginning of the menu-to-video transition, when the DVD user selects a button at an arbitrary point in time. In an animation leading from a first menu page to a second menu page, buttons, labeling and arrows are exchanged, and all objects (or at least the objects associated with buttons, labelings and arrows) are provided twice by the 3D modeler (for example NSG_BS01I to NSG_BS06I, NSG_UpI, and so on; the suffix "I" indicating "incoming").

In the following, an example for a DVD menu will be described with reference to FIGS. 14 to 17. The example of FIGS. 14 to 17 is based on a three-dimensional template which describes (or shows) modeled monitors supported by a system of rods and pistons. The exemplary template is designated as "monitor template".

FIG. 14 shows a graphical representation of an example for a menu with four chapters. The graphical representation of FIG. 14 is designated in its entirety with 1400.

FIG. 15 shows a graphical representation of an example for a menu with eight main chapters, wherein the user can navigate to a next and a previous menu page (or to a first and a second menu page). The graphical representation of FIG. 15 is designated in its entirety with 1500.

The graphical representation 1400 shows four monitor screens 1410, 1412, 1414, 1416. Each of the monitor screens represents one menu item or menu button for the selection of a chapter of a video content on a DVD. It should be noted that the menu scene as shown in FIG. 14 is generated on the basis of a three-dimensional scene model or a three-dimensional scene template describing a total of six monitors. A menu page having six monitors can, for example, be seen in a left menu page 1510 of the graphical representation 1500 of FIG. 15. Thus, it can be seen from the graphical representation 1400 that the last two monitors (i.e. a middle monitor of the lower row of monitors and a right monitor of the lower row of monitors) and the (corresponding) chapter designations are removed from the three-dimensional scene. Also, when comparing the menu scene of FIG. 14 with the menu scene of FIG. 15, it can be seen that the menu scene of FIG. 14 does not comprise any arrows. This is due to the fact that the arrows are not necessitated, as there are no additional menu pages of the menu represented by the menu scene of FIG. 14.

With respect to the graphical representation 1500 of FIG. 15 it should be noted that the menu described by the menu scene of FIG. 15 comprises two menu pages. A first menu page comprising six menu entries is designated with 1510, and a second menu page comprising two menu entries is designated with 1520. In other words, assuming that the template defining the menu scene comprises six menu entries, the first main menu page 1510 is filled completely. The first menu page 1510 further comprises a navigation arrow 1530. The navigation arrow 1530 serves as a navigation element, and may also be referenced as a "next" arrow.

On the second menu page 1520 (also designated as main menu page 2) only two remaining of the eight total videos and, correspondingly, a "back" arrow (or "previous" arrow) is superimposed (or displayed). The "back" arrow 1540 allows navigating back to the previous page, i.e. to the first menu page 1510.

FIG. 16 shows a graphical representation of an example for a menu with eight main chapters. The graphical representation of FIG. 16 is designated in its entirety with 1600. It should be noted here that the main menu of the example of FIG. 16 may be identical to the main menu of the example of FIG. 15. In other words, the graphical representation 1600 shows a first main menu page 1610, which may be identical to the first menu page 1510 of FIG. 15. The graphical representation 1600 further shows a submenu page 1620. It should be noted here that the first main chapter has five further subchapters. In other words, by selecting or activating the first monitor (or button) 1630 of the first menu page 1610, the submenu 1620 may be displayed. As the first monitor or first button 1630 represents the first main chapter, the four subchapters of the first main chapter can be accessed over the menu page 1620. It should further be noted that a user can navigate back (from the submenu page 1620) to the main menu (or a main menu page 1610) by selecting an "Up" button 1640 of the submenu page 1620. Moreover, the menu page 1610 comprises a "Next"-button 1650 to access a next main menu page (which is, for example, identical to menu page 1520).

In other words, in the example of FIG. 16 a submenu was set up, which can be addressed via (or by means of) the first button 1630. After a short intermediate sequence, in which (optionally) during an animation both menus (i.e. the main menu page 1610 and the submenu page 1620) are visible, a user sees the submenu (or the submenu page 1620). In an exemplary embodiment, the six monitors of the main menu page 1610 move upwards out of the image (or out of the visible screen), and the new monitors, e.g. the four monitors of the submenu page 1620, follow from below. The submenu (or submenu page 1620) comprises four videos in the given example as well as a corresponding navigation arrow 1660 which allows for an upward navigation back to the main menu or main menu page 1610.

FIG. 17 shows a graphical representation of a template of the main menu, on which the examples described above are based, rendered in a smart3D internal representation.

In the template, the designer provides the maximum usable number of six monitors 1710, 1712, 1714, 1716, 1718, 1720. Besides, it is necessitated that the three navigation elements 1730 "arrow back", "arrow next" and "arrow up" are present. The header 1740 and footer 1750 as well as the chapter titles follow predetermined name conventions. Further, the image area for the chapter images (or chapter video frames) has predetermined material names (NSGBS01, NSG_BS02, NSG_BS03, NSG_BS04, NSG_BS05, NSG_BS06).

The individual monitors are summed up in a group defined respectively with a corresponding name (i.e. one group per monitor, such that all the elements and/or objects belonging to a certain monitor are contained in a group belonging to the certain monitor). Provided these conditions are fulfilled, the smart3D engine can adapt the scene dynamically to the menu content, as can be seen in the above examples.

It should be noted here that the graphical representation 1700 is designated in its entirety with 1700. It should be noted that the template 1700 comprises a plurality of menu items. In a typical embodiment, a corresponding plurality of geometrical objects is associated with a menu item. The geometrical objects associated with a particular menu item are grouped together, i.e. are contained in a group of geometrical objects. Thus, by identifying a group of geometrical objects, the geometrical objects belonging to the menu item can be identified. Assuming that the scene model or scene template describes n menu items, the template comprises n groups, each of the n groups summing up the objects belonging to a particular menu item. The objects belonging to a particular menu item may, for example, comprise:

a surface having a predetermined name or property indicating that the surface is intended to display a user-provided content associated with the menu item, without specifying the particular user-provided content. In other words, the respective surface is a place-holder surface for a user-provided content, designated by the characteristic name or property.

a place-holder object having a predetermined name identifying the text place-holder object intended to be replaced by the user-provided text. The text place-holder object may, for example, be intended to provide a "title" and/or information about a video sequence associated with the menu item.

Thus, the video frame generator 110 may be adapted to identify how many menu entries should be displayed in a menu scene (or menu page) based on the menu scene model. The video frame generator may also be adapted to determine how many groups defining individual or separate menu entries are present in a menu template. According to the above-described information, the video frame generator 110 may deselect or remove superfluous objects belonging to menu entries if the menu scene model or menu template comprises more menu entries than actually necessitated. Thus, it can be ensured that a template comprising a certain number of video entries can be applied, even if less menu entries are necessitated than contained in the template.

Figure 18:
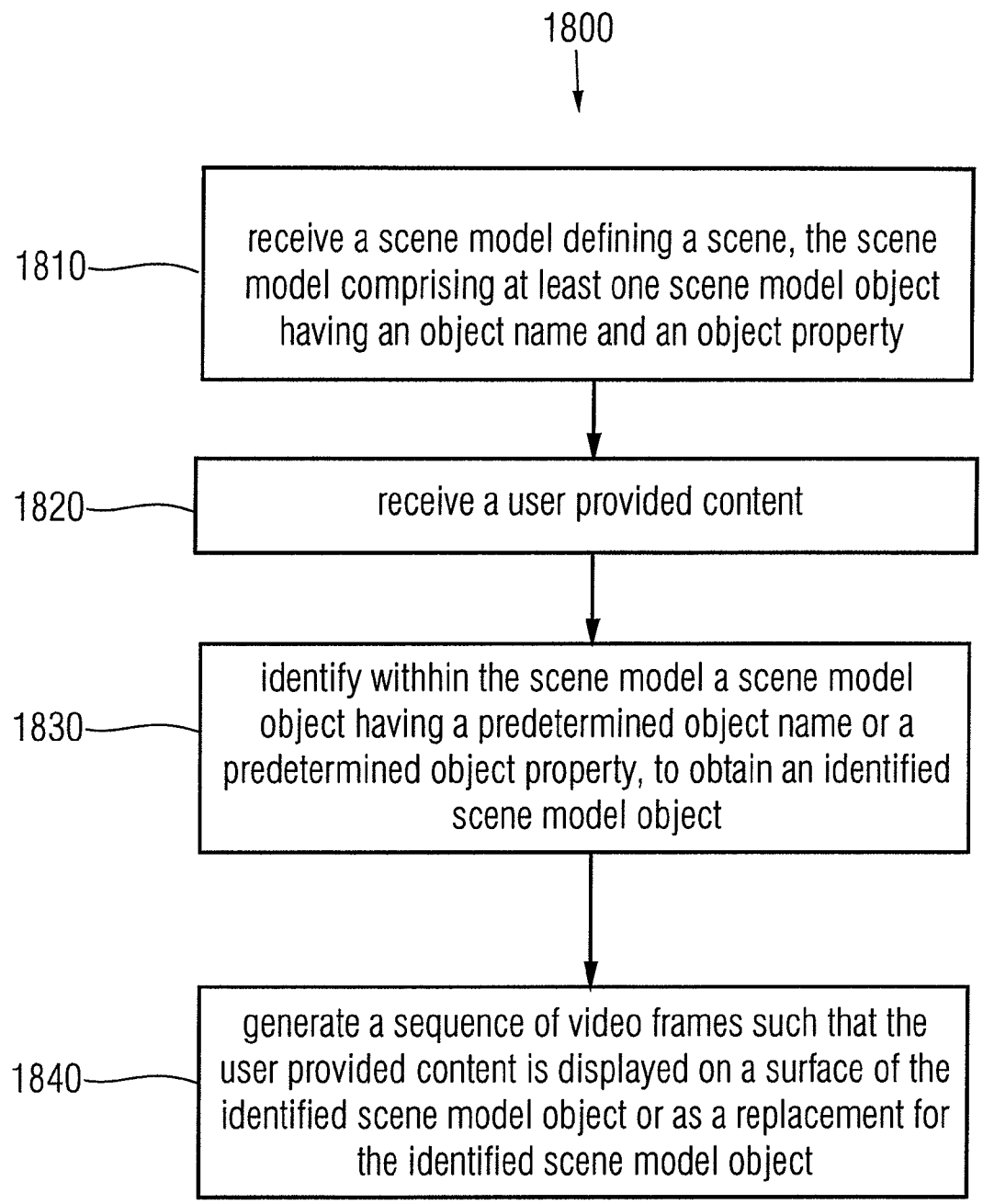
FIG. 18 shows a flowchart of an inventive method for generating a sequence of video frames.

FIG. 18 shows a flowchart of an inventive method for generating a sequence of video frames. The method of FIG. 18 is designated in its entirety with 1800. In a first step 1810, a scene model defining a scene is received. The scene model advantageously comprises at least one scene model object having an object name and an object property.

The method 1800 further comprises a second step 1820, in which a user-provided content is received.

In a third step 1830, a scene model object having a predetermined object name or predetermined object property is identified within the scene model. Thus, an identified scene model object is obtained.

In a fourth step 1840, a sequence of video frames is generated such that the user-provided content is displayed on a surface of the identified scene model object or as a replacement for the identified scene model object.

It should be noted here that the method 1800 of FIG. 18 may be supplemented by any of the steps described above, for example by any of the steps executed by the inventive video frame generator.

Figure 19:
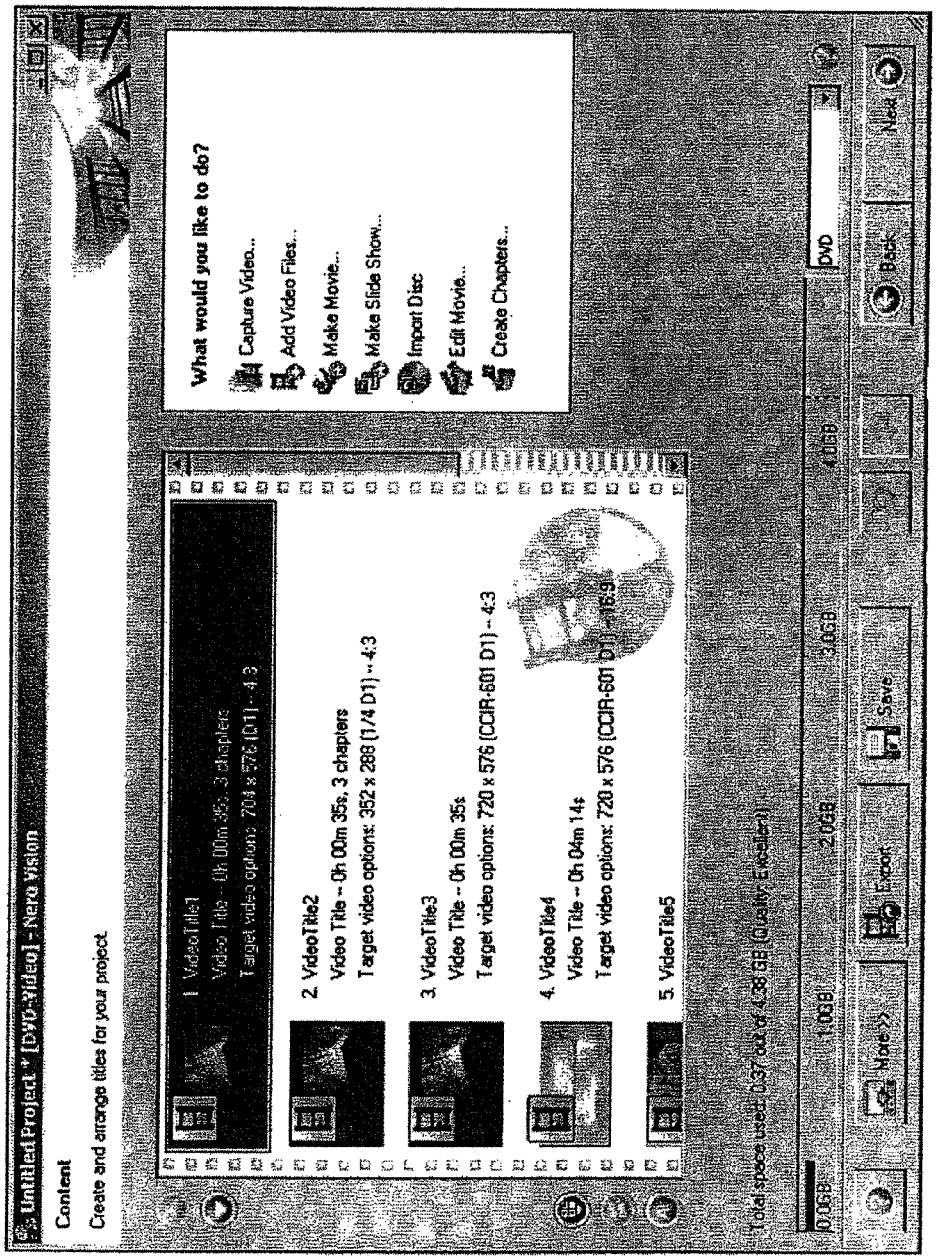
FIG. 19 shows a graphical representation of a user interface for a selection of video titles.

In the following, an exemplary embodiment of an inventive apparatus and method for creating a menu structure of a DVD (or, in general, a video medium) will be described. For this purpose, FIG. 19 shows a graphical representation of a user interface for selecting or importing video sequences. The graphical representation of FIG. 19 is designated in its entirety with 1900. According to an embodiment of the present invention, in a first step a user imports a video title which he wants to present on a DVD (or on any other video medium, like an HD-DVD, on a Blu-ray disc or on any other video medium). Optionally, individual videos may be given chapter marks. If chapter marks are defined for a video, one or more submenus will be created for this video title. Each button in the submenu represents one chapter position. The video title can, therefore, be started with the defined chapter positions.

Figure 20:
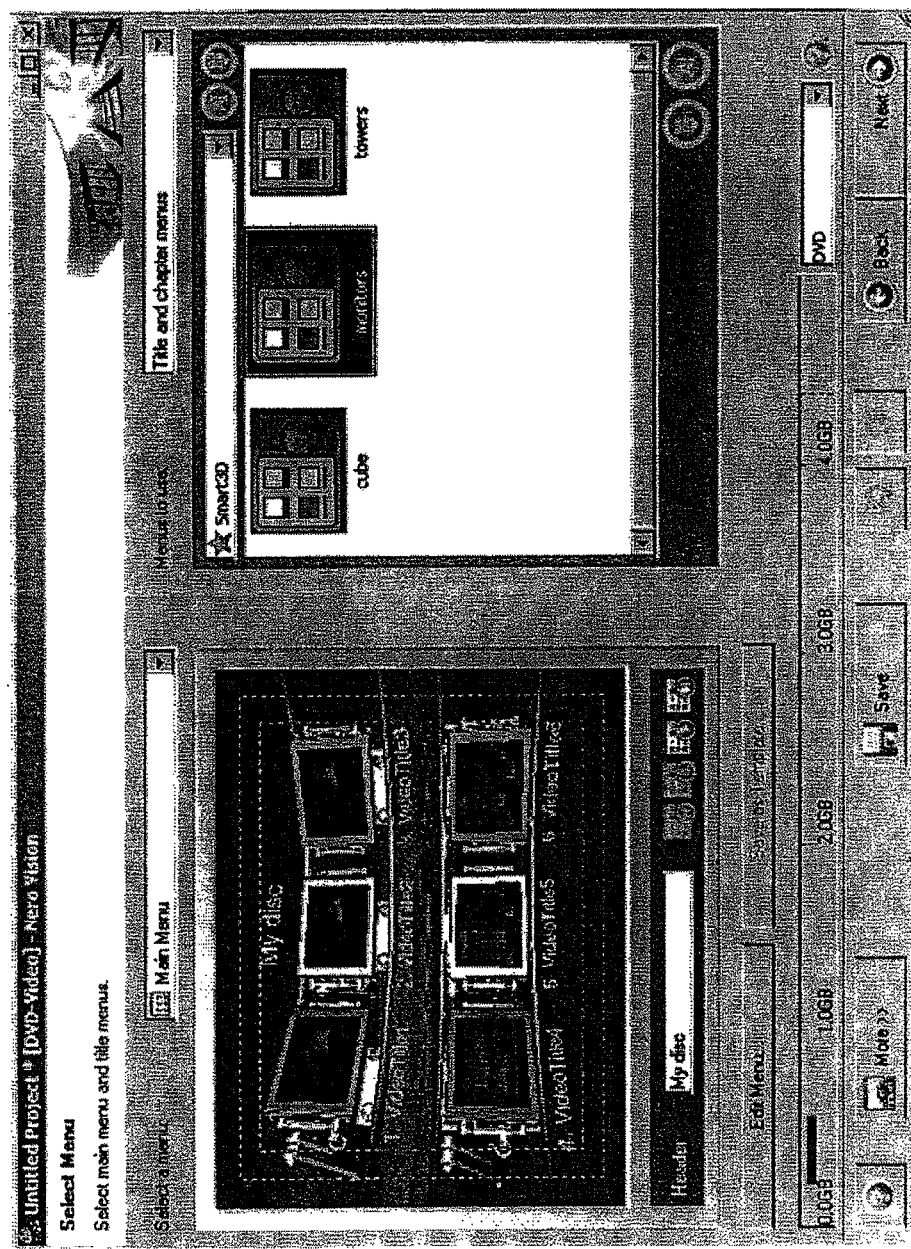
FIG. 20 shows a graphical representation of a user interface for choosing a predefined smart3D template.
Figure 21:
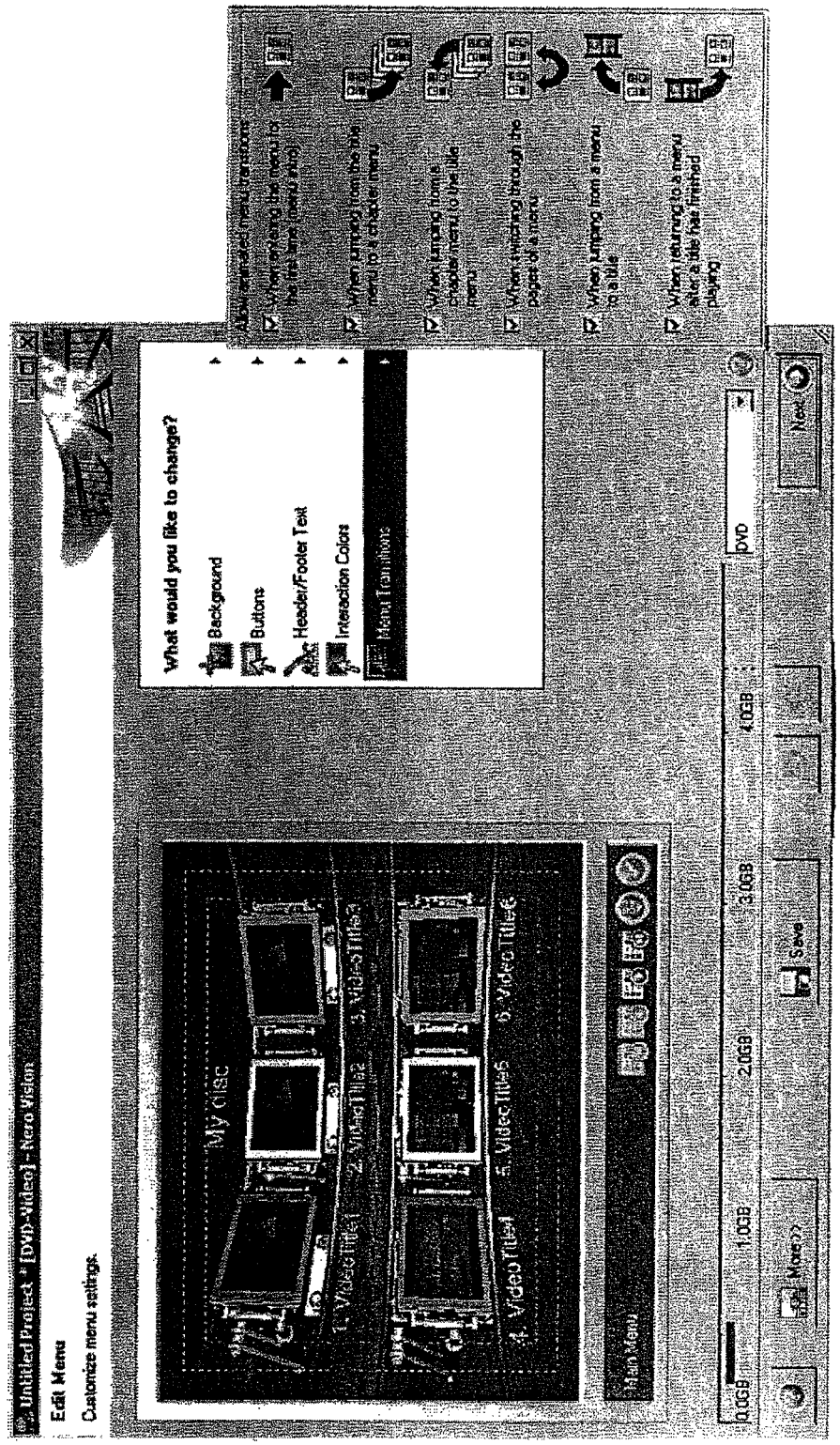
FIG. 21 shows a graphical representation of a user interface for adapting a smart3D template to user requirements.

FIG. 20 shows a graphical representation of a user interface page for choosing a template or a scene model. In other words, in an embodiment of the present invention, in a second step the user chooses a predefined or predetermined smart3D template (i.e. a pre-created scene model). FIG. 21 shows a graphical representation of a screen shot of a user interface for the selection of properties of a DVD menu structure.

In other words, according to an embodiment of the present invention, the user can adapt 3D template settings to suit his needs in a third step. This allows a button text, a header text, a footer text, and/or a background music to be changeable. In other words, the user can, for example, enter settings or adjustments with respect to the chapter title to be displayed instead of a place-holder object in the scene model or menu template. Similarly, the header text and the footer text may be defined as a replacement for text place-holder objects in the template.

Besides, the user can define which menu transitions (out of the following list of possible menu transitions) to use:
  intro animation;
  transition animation between two menus;
  transition animation between the menu and the chapter menu;
  transition animation between a menu and a video title; and
  transition animation between a video title and a menu.

Figure 22:
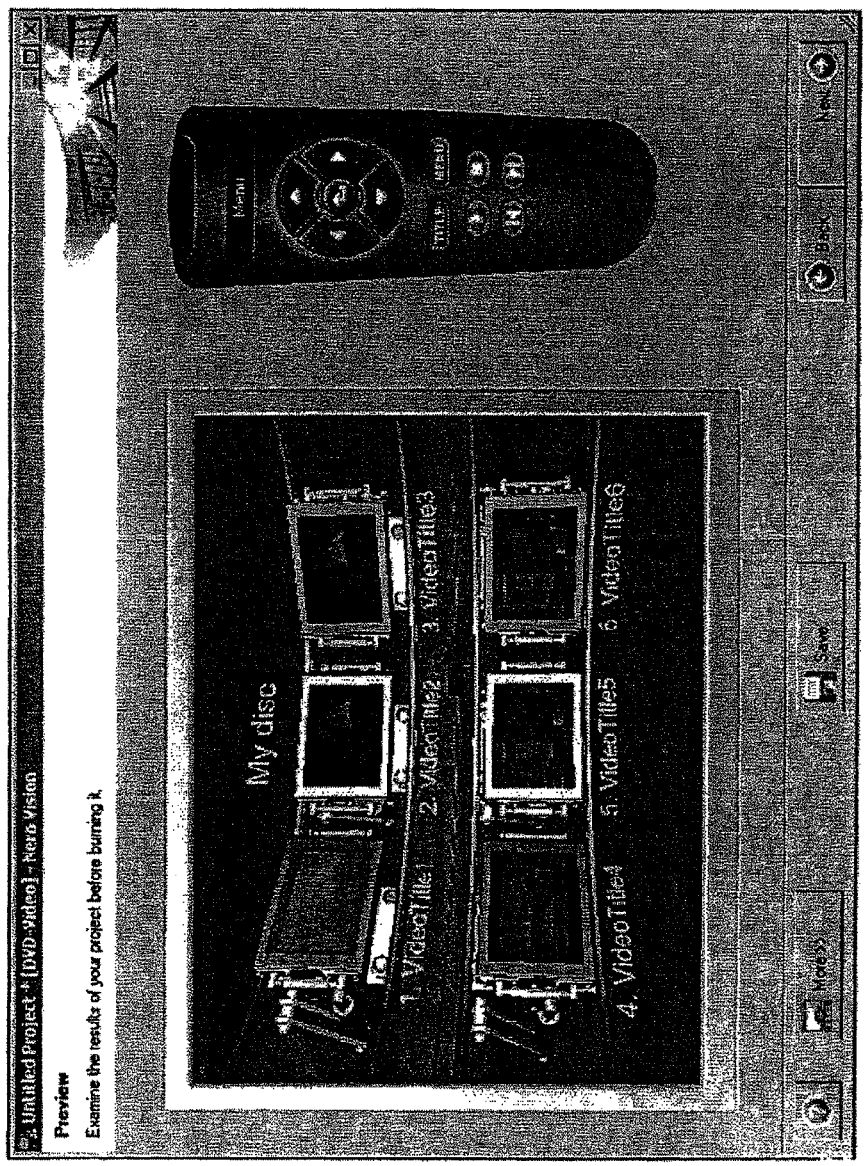
FIG. 22 shows a graphical representation of a user interface presenting a user defined menu structure created by a smart3D engine.

According to an embodiment of the present invention, in a fourth step a menu structure created by the smart3D engine can be observed using a virtual remote control in a preview. The menu transitions may optionally be calculated by the smart3D engine in real time. Thus, FIG. 22 shows a graphical representation of a screen shot of a user interface allowing the user to preview menu transitions.

According to an embodiment of the present invention, in a fifth (optional) step a DVD (or a blu-ray medium, a HD-DVD or another video medium) is burned or prepared.

It should be noted here that with reference to FIGS. 19 to 22 a process of creating a smart3D menu was shown from a user's point of view. It should further be noted that the user entries described with reference to FIGS. 19 to 22 or a selection therefrom may be input to the video frame generator in order to control a replacement of a place-holder object by a user-provided content, or a displaying of the user-provided content on a place-holder surface.

Thus, the user input controls the generation of the sequence of video frames on the basis of the scene model (also designated as scene template or just as "template") and on the basis of the user-provided content.

In the following, a summary of a menu authoring concept according to an embodiment of the present invention will be given.

It should be noted that one DVD typically contains a certain amount of videos. These videos are accessed through one or more menu pages, wherein each video, video chapter mark, or another menu is represented by a selection button (e.g. by a button in a menu page). The contents of a DVD can be navigated by linking the buttons with the menu pages or videos. Thereby, different fixed short video sequences or still images represent different menu pages.

The inventive concept (also designated as smart3D technology) allows for an automatic generation of the above-mentioned menu pages from an amount of videos defined by a user. Additionally, a transition video is calculated, either between two menu pages or between the menu pages (or at least one Menu page) and the video title defined by the user. This gives the user the illusion of seamless, interleaved and interactive video scenes. Individual menu pages and videos are no longer hard cuts placed one after another, but in a virtual three-dimensional world appear to melt into each other.

A creation of the animated menus structures is performed automatically with the smart3D engine. The user simply specifies which content (video title or video titles) he or she wants to present on the disc and chooses the predefined smart3D templates (for example, one template out of a list of predetermined templates). The smart3D engine then calculates the needed amount of menus, buttons per menu and transition videos between two menus or between the menu and a video title.

An individual predefined smart3D template demonstrates (or represents) three-dimensional video scenes (or at least one three-dimensional video scene). For example, individual menu pages can be interpreted as different sides of a room in a template. If the user navigates through the different menus, a video sequence created by the smart3D engine is played as a transition. The transition shows a video transition scene which is seamlessly adapted to both menu scenes. Seamlessly adapted video transition scenes are created between menu pages and video titles.

As the smart3D engine is integrated between the authoring application and the authoring engine, the same animated menu structure can also be created for DVD video and also for blue-ray media and HD-DVD media.

In the following, some characteristics of an embodiment of the inventive system will be described, along with some requirements and remarks with respect to a general setup.

To summarize some aspects of the embodiment of the present invention, the following can be stated:
  Any number of movie sequences can be merged by concatenation via fluent 3D transitions.
  Linked (or merged or concatenated) movie sequences can be assembled into a common menu structure.

A menu consists of an intro sequence and one or more main menu pages. Optionally, the menu structure may provide submenu pages for addressing various chapters of a movie stream. The menu pages are linked by a smooth transition which includes transitions to the first frame of each movie (or, at least, to the first frame of one movie).

A menu scenery adapts the content dynamically. A presence and/or appearance of a menu button (or navigation button, respectively) depends on the number of menu chapters. The smart3D engine takes care of the dynamic adjustment of the menu scenery.

The smart3D engine combines a high-level content (the user input) with a low-level content (generic models of the menu scenery with special tags to enable dynamic interpretation) and meta-data (general menu sequence information, time stamps) to produce video output in the form of separately rendered video frames. Additionally, the smart3D engine provides information about highlighted areas and selection regions used for menu navigation.

The above-described data is generated automatically by the smart3D engine using special tags (e.g. names or properties) in the 3D model of the menu scenery.

Each menu can have various lines of three-dimensional texts, for example header, footer or chapter captions. The text is editable, i.e. the 3D meshes of the font characters are advantageously generated on the fly.

The rendering of the transitions, three-dimensional effects and menus is interactive. Hardware acceleration through a modern graphics card is exploited for high-performance visualization of the three-dimensional scenery.

In the following, some implementation details will be described.

According to one embodiment of the present invention, an idea behind the smart3D concept is to separate the three-dimensional data (3D data) with structuring information from the engine, which interprets the structure and renders a dynamic three-dimensional model. For the organization of the data, the common means for 3D data will be used.

In an embodiment, all the elements will get a name and there are data elements which allow grouping of other elements. The names and grouping can specify a special function for a 3D object or group (e.g. the function as a button, as described above).

In the implementation of smart3D, the engine reads a generic 3D data format. Therein, a block of meta-data will define the function of the 3D model. For example, for a DVD menu this meta-data can outline the 3D scene as a menu-to-video transition, which will be played when the end user selects a video button in the DVD menu and before the selected video will be shown. Other information contained in the meta-data block can determine the button number or the name of the DVD menu this transition belongs to.

A complete set of 3D data for the authoring of video content then consists of files with 3D and structuring data for any possible parts of the menu or video effects. To make this method of content creation accessible for others, it is possible to import other file formats apart from the generic one. As further components, there are sound files to specify the music or noise which will be played within (or during) the specific menu part or video effect.

To enable the engine of smart3D to react flexibly on the needs of the user, there are some naming conventions for the 3D objects or grouping elements in the 3D model. For example, a special name of "NSG_BS04" can specify an object as the fourth button in a DVD menu. With that name, the engine will remove the object if there is no need for a fourth button, for example the user has inserted three video clips only. Another name, like "NSG_NxtH" (note the "H" for "Highlight" at the end of the name), can determine an object or group as defining for the highlight region of a possible next button in a DVD menu. With the means of grouping, it is possible to have a geometric structure which will be removed by the smart3D engine, if not needed, and a smaller one which will be considered when calculating the highlight region. An example of a highlight mask of the "Monitors" menu with six menu buttons and three navigation arrows is shown in FIG. 23.

In an external data file, text will be interpreted as an ordinary geometric object. Thus, the meaning of this object as a collection of readable characters gets lost and therefore cannot be reinterpreted to change the text. But this is necessary to give the users the possibility to insert their own text in a 3D scene, which afterwards will be part of a DVD menu or video content.

For this purpose, a method has been established to replace objects with special names like "header" with an editable 3D text, which in this example represents the heading of a DVD menu part.

In this sense, the implementation of smart3D allows an independent modeler to create an arbitrary number of authoring and video content without the need to deal with software development. The engine of smart3D has the ability to interpret the structure and meta-data of the 3D models and thus knows about the function of each part of the 3D scenes.

In general, the present application comprises a method, apparatus and computer program for generating animated scenes for the creation of interactive menus and video scenes.

Figure 24:
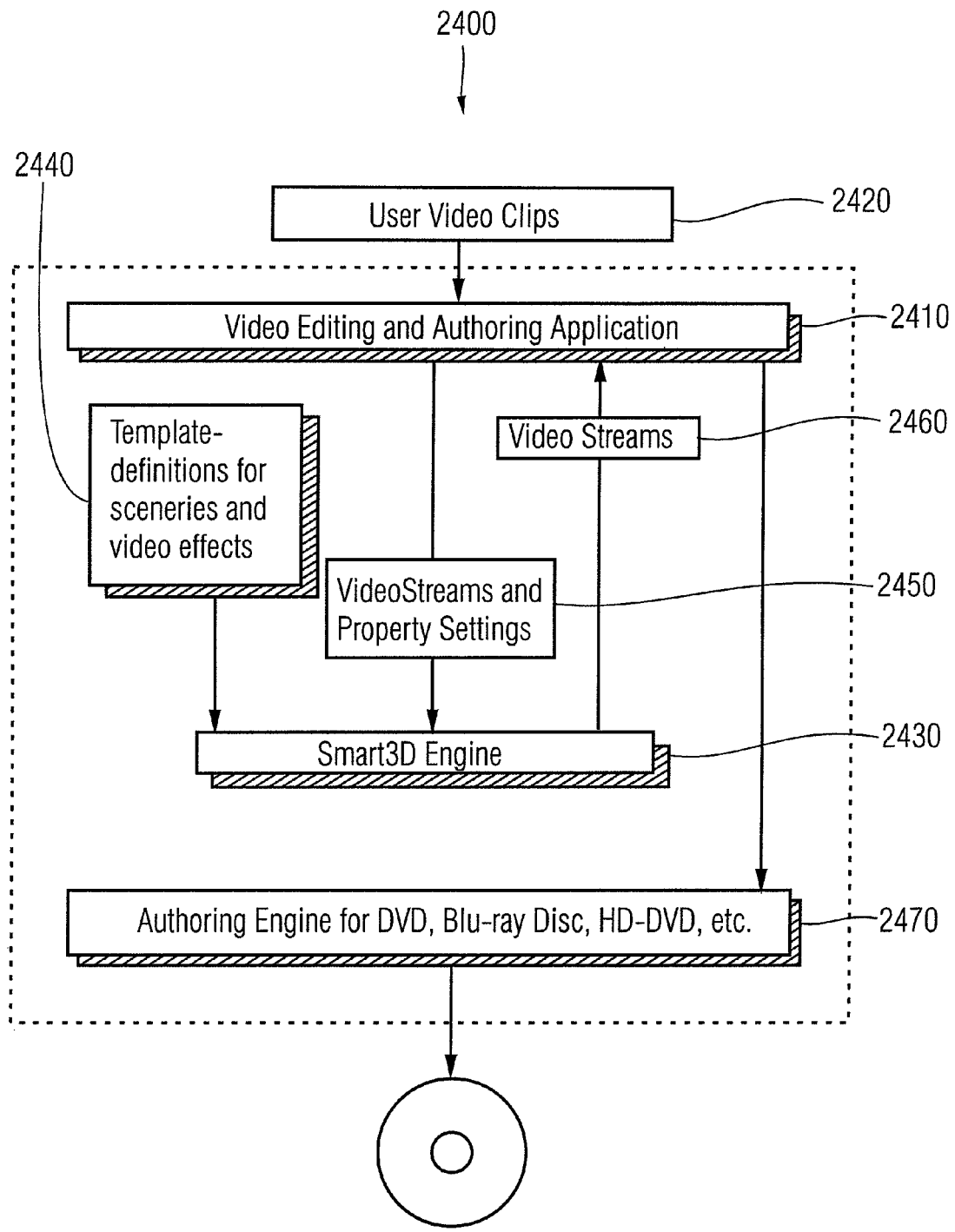
FIG. 24 shows a graphical representation of a general work flow of the Nero smart3D environment.

In the following, further implementation details will be described with reference to FIG. 24. FIG. 24 is a graphical representation of a hierarchy of modules for the authoring of the content of a video medium. The graphical representation of FIG. 24 is designated in its entirety with 2400. The process of authoring a content of a video medium is controlled by a video editing and authoring application 2410. The video editing and authoring application 2410 receives one or more user video clips 2420. The video editing and authoring application further receives user input not shown in the graphical representation 2400 of FIG. 24. The user input to the video editing and authoring application 2410 may, for example, comprise information about how many user video clips 2420 are to be contained on the video medium. The user information may further comprise an information about title names of the video clips (or sequences of video frames) to be included on the video medium. The user input may further comprise a user selection about details of the menu structure. For example, the user input may comprise a definition of which menu template out of a plurality of available menu templates (or scene models) should be used for the generation of the menu structure of the video medium. The user information may further comprise additional settings, like color settings, the selection of a background image, the selection of a music title and so on.

A rendering of video sequences to be stored on the video medium is performed by a so-called smart3D engine 2430, which is equivalent to the video frame generator 110. The smart3D engine 2430 receives one or more template definitions for sceneries and video effects. The template definitions 2440 are equivalent to the scene models 112 and describe a scene in terms of objects as well as grouping information and property information.

The smart3D engine further receives from the video editing and authoring application 2410 one or more video streams and one or more property settings, the video streams and property settings being designated with 2450. It should be noted here that the video streams are either identical to the user video clips 2420 or are created by the video editing and authoring application 2410 on the basis of the user video clips. The smart3D engine 2430 is adapted to create one or more video streams 2460 and deliver the one or more video streams 2460 back to the video editing and authoring application 2410. It should be noted that the video streams 2460 are equivalent to the sequence 116 of video frames.

The video editing and authoring application 2410 is adapted to build up a menu and content structure for the video medium on the basis of the video streams 2460 provided by the smart3D engine 2430. For this purpose the video editing and authoring application is adapted to identify (on the basis of some meta-information) which type of video content the video streams 2460 represent. For example, the video editing and authoring application 2410 may be adapted to recognize, if a particular video screen 2460 represents a menu-to-menu transition, a menu-to-video frame sequence transition, a sequence-of-video-frames-to-menu-transition, an introductory transition (between a black screen and a menu) or a sequence-of-video-frames-to-sequence-of-video-frames transition. Based on the information on the type of video stream, the video editing and authoring application 2410 places the video stream in an appropriate position within a data structure of the video medium.

If, for example, the video editing and authoring application 2410 recognizes that a particular video stream 2460 is a menu-to-video-transition, the video editing and authoring application 2410 sets up the structure of the video medium such that the menu-to-video transition is played between a particular, corresponding menu and a particular, corresponding video (or movie), if within the particular menu the user selects to play the particular movie.

In another example, if a user selects to change from a first menu page to a second menu page, for example by selection of a specific button (the next-button) on the first menu page, the menu-to-menu transition between the first menu page and the second menu page should be shown to the user. Therefore, the video editing and authoring application 2410 arranges the respective menu-to-menu transition on the video medium such that the menu-to-menu transition is played when the user selects the above-mentioned button on the first menu page.

When the video editing and authoring application 2410 has created the structure (in particular the menu structure of the video medium), the video editing and authoring application transfers the information to be stored on the video medium to an authoring engine 2470. The authoring engine 2470 is adapted to format the data provided by the video editing and authoring application 2410 in such a way that the data is compliant with the specification of the respective video medium, e.g. a DVD medium, a blu-ray disc, a HD-DVD or any other video medium. Also, the authoring engine 2470 is adapted to write the data provided by the video editing and authoring application 2410 to the video medium.

To summarize the above, it can be stated that FIG. 24 shows the general work flow of the smart3D engine.

In the following, some specific details regarding the above-described invention will be given.

First, some additional details with respect to the calculation of the transition video will be described. It should be noted that for the calculation of a transition video, the video frame generator receives two video images or video frames, one video frame taken from the vanishing video, and one video frame taken from the emerging video. The images or video frames both correspond to the same point in time as the final video stream (or the final sequence 116 of video frames). A temporal position of the two images or video frames in the input video stream is dependent on the length of the individual input video streams (or input videos) and the duration of the overlap or transition. However, in an embodiment the 3D engine does not take into consideration an absolute time information.

On the basis of the two input images or input video frames, a single output image or output video frame is generated. In the generation of the output video frame, a texture of respectively named materials in the three-dimensional scene (described by the scene model) is replaced by the input video frame. Thus, the output image or output video frame is an image of the three-dimensional scene, with a texture of an object being replaced by the first input video frame and another texture of an object being replaced with the second input video frame.

Furthermore, it will be described which files or software are used for the generation of a DVD menu:
  one or more files describing a three-dimensional scene in the three-dimensional animation.
  one or more description files describing the structure of a scene graph and additional administration data (e.g. the name of the 3D template, the type of the intermediate sequence, and so on);
  video image software providing the image data or video data and re-joining the video data;
  a 3D engine integrating the image data and text data into the 3D scene, formatting the scene in accordance with the input data, and rendering the 3D scene subsequently.

For the generation of the DVD menu, in an embodiment of the present invention any possible menu combinations and menu intermediate sequences are rendered according to the number and division of the chapters when generating the DVD. Furthermore, the menu combinations and the menu intermediate sequences are burned onto the DVD in a video file. Furthermore, a navigation file (having a file name extension ".ifo" and being known from the specification of a DVD video disc) is generated. The navigation file allows a DVD player to jump to the respective sequences (i.e. to jump, for example, to the beginning of the transition videos.

In order to determine the menu structure, a correspondingly modeled 3D scene is adapted in accordance with a number and structure of the available video chapters. Parts of the modeled three-dimensional scene which are not necessitated (e.g. not-necessitated menu items) are automatically removed, so that they are not shown in the finally generated sequence of video frames. Further, user-editable text blocks are generated.

Thus, three-dimensional menus are generated, wherein an animated sequence is played between the menu pages. Moreover, a highlight mask is generated automatically from three-dimensional objects having a predetermined name. Thus, it is possible to create an arbitrarily shaped highlight mask.

One of the key advantages of an embodiment of the present invention is the fact that a menu designer (e.g. a 3D modeler) merely has to pre-model generic menu sequences.

The user of the DVD authoring software is not involved in this task. An adaptation and generation of the menu video sequences is performed automatically according to the characteristics of the chapter distribution.

In the following, it will be described how a plurality of movie sequences can be linked (or combined) by concatenation. It is assumed here that a video movie consists of 30 individual movie pieces. Thus, having 30 individual movie pieces, the total movie may have, for example, 29 transitional sequences. Alternatively, if a fade-in-effect at the beginning and a fade-out-effect at the end of the movie is considered, there are, for example, 31 transitional sequences.

The 3D engine merely processes the data of a current transition. In other words, in a first step a transition between the first movie piece and the second movie piece is processed. Subsequently, in a second step, a transition between the second movie piece and a third piece is calculated, and so on. From a point of view of the cutting software, the temporal course is as follows:

- coding of a front portion of the first movie piece, and storing the coded information into a video stream of the completed movie;
- uploading the necessitated image data (or video data, or movie data) from the end of the first video piece (video piece 1) and the beginning of the second video piece (video piece 2) to the smart3D engine (wherein the end portion of the first video piece and the beginning portion of the second video piece constitute the user-provided content);
- fetching the image data (or video data, or movie data, or sequence of video frames) of the rendered transition from the smart3D engine;
- coding the individually rendered images (or video frames), and storing of the coded information into the video stream of the completed movie;
- coding of a middle portion of the second video piece, and storing the processed information into the video stream of the completed movie;
- uploading the necessitated image data from the end of the second video piece (video piece 2) and the beginning of the third video piece (video piece 3) to the smart3D engine;
- fetching the image data of the rendered transition from the smart3D engine;
- coding of the individually rendered images (or video frames), and storing the rendered information into the video stream of the completed movie.

The described procedure may be repeated until any necessitated transitions are calculated. It should be noted that a single video file may be generated by the above-described concatenation, as the individual movie pieces as well as the transition sequences are stored in a single video file.

With respect to a dynamic adaptation of the menu scenery, it should be noted that the authoring software decides about an allocation of the chapter buttons to image data and text data. Also, the authoring software decides which objects (from the scene model) are necessitated in a particular scene, and which object need to be adapted (e.g. text content). The respective decisions are made at the point in time when the DVD is created, for example when the menu video is rendered. In an embodiment of the present invention, a modification of the menu structure is no longer possible after the creation of the DVD.

Moreover, it should be noted that within the scope of the present invention, the term "high-level content" designates user-provided data, for example video streams, chapter images, chapter titles or a highlight color. On the other hand, the term "low-level content" describes a generically modeled 3D scenery (e.g. a scene model which is not adapted to user-provided content, but which comprises place-holder objects or place-holder surfaces). Further, the term "meta-data" describes which 3D model files form a menu together. It should be noted that a complete menu comprises a scene for a generic selection page, and a plurality of animated intermediate sequences linking the individual menu pages by a motion of individual objects. In an embodiment, a different animation sequence is defined for an interaction with a first chapter button and for an interaction with a second chapter button. The meta-data further comprise information about a duration of individual menu sequences, information about a name of a menu or a reference to additional audio tracks.

With respect to highlight regions and selection regions, it should be noted that highlight regions and selection regions are designated by a respective grouping and naming of the involved objects.

With respect to the generation of meshes of font characters, it should be noted that for the generation of 3D meshes of font characters not all font characters comprised in a font file are represented as a three-dimensional mesh. Instead, a mesh of a font character is calculated when the font character is used for the first time. The calculated mesh is subsequently used for the representation of the particular font character. As an example, the described treatment of the font characters allows that for a representation of the text "Hello World" as a three-dimensional text, wherein only 7 three-dimensional meshes (rather than 10 three-dimensional meshes) are necessitated, as the three-dimensional mesh for the character "l" can be used three times (in a shifted manner) and the character "o" can be used twice.

It should be noted here that the generation of the font characters differs from the generation of the rest of the video frames. Any objects or meshes with the exception of the three-dimensional meshes for the font characters are provided by a designer, e.g. a person who has created the scene model (also designated as "scene modeler"). Instead of a 3D mesh for the font characters, the designer places respectively named boxes, which are replaced at run time with a text entered by a user (i.e. a three-dimensional representation of the text). The height and thickness of the box (to be more general: dimensions of the box) define the dimensions of the three-dimensional font characters. Texture properties and material properties are also taken from the box (to the graphical representation of the text characters). In other words, the three-dimensional representation of the text entered by the user has the same texture and material properties as the box.

In the following, possible user interactions which may be used for rendering transitions will be described. To be general, the look of a three-dimensional scene can be influenced from outside (i.e. by a user) via a dialog. In the description file described above, respective object properties can be marked to be editable. These properties are represented in accordance with their type in a dialog. As soon as a user changes this properties, the changed properties are taken into account in the scene. In this way, it is, for example, possible to change object colors, background images and/or flight trajectories (of objects) within a predetermined range.

It should further be noted that in an embodiment of the present invention the rendering can be interactive with respect to a speed of presentation. Conventional cutting programs typically use the central processing unit of a computer in order to represent effects. This is typically very slow, and the representation is not smooth. The inventive concept (e.g. the smart3D engine) uses 3D graphic hardware (which is nowadays available in almost any computer) consequently. Only if a 3D graphic card is not present, a comparatively slow CPU-based solution is chosen. A usage of a scene graph for representing a three-dimensional scene contributes to a high-performance representation.

It should further be noted that the smart3D engine can be accessed from the outside in a similar way like a conventional 2D engine. However, in the processing of menus the additional intermediate sequences are taken into consideration. Besides, a large portion of the logistics is encapsulated within the smart3D engine.

It should further be noted, that the present invention can be implemented in the form of a computer program. In other words, depending on certain implementation requirements of the inventive methods, the inventive methods can be implemented in hardware or in software. The implementation can be performed using a digital storage medium, for example a disk, DVD, CD, ROM, PROM, EPROM, EEPROM or FLASH-Memory, having electronically readable control signals stored thereon, which cooperate with a programmable computer system such that the inventive method is performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

To summarize the above, the present invention creates a concept for a template-based generation of video transitions, menu-to-video transitions and menu-to-menu transitions. Furthermore, the present invention allows for a template-based generation of interactive menus. Thus, the present invention allows for a user-friendly creation of video media.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Apparatus for providing a sequence of video frames on the basis of a scene model defining a three-dimensional pre-modeled scene, the scene model comprising at least one scene model object having an object name or an object property, and on the basis of a user-provided content, the apparatus comprising:
   a video frame generator adapted to produce a sequence of a plurality of video frames on the basis of the scene model,
   wherein the video frame generator is adapted to parse the scene model to identify within the scene model one or more scene model objects or surfaces having a predetermined name or a predetermined property, to obtain an identified scene model object or surface; and
   wherein the video frame generator is adapted to insert into the scene model a reference indicating to apply the user-provided content as a texture for an identified surface, to adapt the scene model to user requirements or
   wherein the video frame generator is adapted to set a texture property of an identified object or surface to designate the user-provided content as a texture to be applied, to adapt the scene model to user requirements; and
   wherein the video frame generator is adapted to render the sequence of video frames on the basis of the scene model, such that the sequence of video frames shows a view of the scene described by the scene model as seen by an observer at an observation point, and such that the user-provided content is displayed on a surface of an identified scene model object or on an identified surface, taking into consideration a relative position of the scene model objects with respect to each other and with respect to an observation point
   wherein the scene model defines the scene in terms of a listing of geometrical objects, characteristics of the objects present in the scene and characteristics defining a portion of the scene model which is visible for an observer at the observation point; and
   wherein the scene model defines the scene in terms of material characteristics or surface texture characteristics of at least one scene model object.

2. The apparatus of claim 1, wherein the scene model defines a scene in terms of a motion of objects with reference to an observer.

3. The apparatus of one of claim 1, wherein the video frame generator is adapted to identify a surface of a scene model object having a predetermined name, material characteristic, texture characteristic or surface characteristic, to obtain an identified surface; and
   wherein the video frame generator is adapted to generate a frame of the generated sequence of video frames such that a frame of a user-provided video sequence or a user-provided image is displayed on the identified surface.

4. The apparatus of claim 1, wherein the video frame generator is adapted to identify a first surface of a scene model object, the first surface having a first predetermined name, predetermined material characteristic or predetermined texture characteristic, and a second surface of the scene model object, the second surface having a second predetermined name, predetermined material characteristic or predetermined texture characteristic,
   the first predetermined name being different from the second predetermined name, the first predetermined material characteristic being different from the second predetermined material characteristic or the first predetermined texture characteristic being different from the second predetermined texture characteristic;
   wherein the video frame generator is adapted to generate a frame of the video sequence such that a frame of the first user-provided video sequence or a first user-provided image is displayed on the first identified surface, and such that a frame of a second user-provided video sequence or a second user-provided image is displayed on the second identified surface.

5. The apparatus of claim 1, wherein the video frame generator is adapted to identify a first surface of a scene model object, and a second surface of a scene model object,
   the first surface having a first predetermined name, a first predetermined material characteristic or a first predetermined texture characteristic, and
   the second surface having a second predetermined name, a second predetermined material characteristic or a second predetermined texture characteristic,
   the first name being different form the second name, the first material characteristic being different from the second material characteristic, or the first texture characteristic being different from the second texture characteristic;
   wherein the video frame generator is adapted to generate the video sequence such that a sequence of frames of a first user-provided video sequence is displayed on the identified first surface, and such that a sequence of frames of a second user-provided video sequence is displayed on the identified second surface.

6. The apparatus of claim 5, wherein the apparatus is adapted to receive a user input defining the first user-provided video sequence and the second user-provided video sequence.

7. The apparatus of claim 5, wherein the video frame generator is adapted to generate the sequence of video frames such that a first frame of the generated sequence of video frames is a full screen version of a frame of the first user-provided video sequence, and such that the last frame of the generated sequence of video frames is a full screen version of a frame of the second user-provided video sequence.

8. The apparatus of claim 5, wherein the video frame generator is adapted to provide a gradual or smooth transition between a first frame of the generated video sequence and a last frame of the generated video sequence.

9. The apparatus of claim 1, wherein the video frame generator is adapted to obtain as the user-provided content a user-defined text object showing a user-defined text;
wherein the video frame generator is adapted to identify within the scene model a scene model object having a predetermined object name or a predetermined object property, the predetermined object name or the predetermined object property indicating that the identified scene model object is a text place-holder object; and
wherein the video frame generator is adapted to generate the sequence such that the user-defined text object is displayed instead of the identified text place-holder object.

10. The apparatus of claim 9, wherein the video frame generator is adapted to generate the sequence of video frames such that dimensions of the representation of the user-defined text object in the sequence of video frames are adapted to dimensions of the text place-holder object throughout the sequence of video frames.

11. The apparatus of claim 1, wherein the apparatus is adapted to select, in dependence on a number of menu items to be displayed in the generated sequence of video frames, from a plurality of scene model objects forming the scene model a subset of selected scene model objects, such that the selected scene model objects describe a sequence of video frames in which a number of displayed menu items is adapted to the number of menu items to be displayed, and
wherein the video frame generator is adapted to produce the sequence of video frames on the basis of the selected scene model objects.

12. The apparatus of claim 1, wherein the apparatus comprises a highlight-region scene-model-object-identifier adapted to determine a set of at least one highlight region scene model object from the scene model,
the highlight scene model objects having a predetermined object name or object property; and
wherein the apparatus comprises a highlight-region description provider adapted to provide a description of a highlight region defining an area of a video frame in which at least one object of the set of highlight region scene model objects is displayed.

13. The apparatus of claim 12, wherein the highlight-region description provider is adapted to describe the highlight region as an area of the video frame defined by an entirety of pixels displaying a highlight region scene model object.

14. Method for providing a sequence of video frames on the basis of a scene model defining a three-dimensional pre-modeled scene, the scene model comprising at least one scene model object having an object name or an object property, and on the basis of a user-provided content, the method comprising:
producing, using a hardware or a computer, a sequence of a plurality of video frames on the basis of the scene model,
wherein the scene model defines a scene in terms of a listing of geometrical objects, characteristics of the objects present in the scene and characteristics defining a portion of the scene model which is visible for an observer at the observation point, and
wherein the scene model defines the scene in terms of material characteristics or surface texture characteristics of at least one scene model object;
wherein producing the sequence of a plurality of video frames comprises:
parsing the scene model to identify within the scene model one or more scene model object objects or surfaces having a predetermined object name or a predetermined object property, to obtain an identified scene model object or surface;
inserting into the scene model a reference indicating to apply the user-provided content as a texture for an identified surface, to adapt the scene model to user requirements, or
setting a texture property of an identified object or surface to designate the user-provided content as the texture to be applied, to adapt the scene model to user requirements; and
rendering the sequence of video frames on the basis of the scene model, such that the sequence of video frames shows a view of the scene described by the scene model as seen by an observer at an observation point, and such that the user-provided content is displayed on a surface of the identified scene model object or on an identified surface, taking into consideration a relative position of the scene model objects with respect to each other and with respect to an observation point.

15. An apparatus for creating a menu structure of a video medium on the basis of a scene model defining a pre-modeled scene, the scene model comprising at least one scene model object having an object name or an object property, on the basis of menu-structure-related information defining at least one menu-structure-related characteristic, and on the basis of a user-provided content, the apparatus comprising:
an apparatus for providing a sequence of video frames, in accordance with claim 1,
wherein the apparatus for providing the sequence of video frames is adapted to generate the sequence of video frames on the basis of the scene model, on the basis of the additional information defining at least one menu-structure related characteristic, and on the basis of the user-provided content.

16. The apparatus of claim 15, wherein the menu structure-related information comprises information about the grouping of elements;
wherein an ith group of elements of the scene model describes an ith menu button for access to a user-provided sequence of video frames;
wherein the apparatus for providing a sequence of video frames is adapted to receive an information about a number of user-provided video sequences to be contained on the video medium;
wherein the apparatus for providing a sequence of video frames is adapted to determine, using the information about the number of user-provided video sequences, a number of menu buttons required to access the user-provided video sequences;
wherein the apparatus for providing a sequence of video frames is adapted to identify in the scene model groups of elements, each identified group of elements describing a menu button;
wherein the apparatus for providing a sequence of video frames is adapted to select from the scene model a plurality of groups of elements, each selected group of elements describing a menu button, such that a number of menu buttons described by the selected groups of elements is adapted to the number of menu buttons required to access the user-provided video sequence; and wherein the apparatus for providing the video sequence is adapted to generate the sequence of video frames such that the sequence of video frames displays the elements of the selected groups of elements, and such that additional objects of the scene model describing unused menu buttons to access user-provided sequences are suppressed or attenuated.

17. The apparatus of claim 15, wherein the menu-structure-related information comprises information about which elements of the scene model belong to a highlight group;

wherein the apparatus for providing a sequence of video frames is adapted to generate a description of a region in a video frame in which the objects of the highlight group are displayed.

18. The apparatus of claim 17, wherein the description of the region of the video frame in which the objects of the highlight group are displayed comprises a monochrome image describing in a first color pixels where objects of the highlight group are shown, and describing in a second color pixels where objects of the highlight group are not shown.

19. The apparatus of claim 15, wherein the menu-structure-related information comprises information as to which type of video transition the scene model describes;

wherein the apparatus for creating the menu structure comprises an apparatus for inserting the video frame sequence generated by the video frame generator into a menu structure of the video medium;

wherein the apparatus for creating the menu structure is adapted to determine a position of a video frame sequence in the menu structure on the basis of the information as to which type of video transition the scene model describes; and wherein the apparatus for creating the menu structure is adapted to recognize and process at least one of the following types of video transitions:

menu-to-menu transition,
black screen-to-menu transition,
menu-to-sequence of video frames transition,
sequence of video frames-to-menu transition,
sequence of video frames-to-sequence of video frames transition.

20. A method for creating a menu structure of a video medium on the basis of a scene model defining a pre-modeled scene, the scene model comprising at least one scene model object having an object name or an object property, on the basis of menu-structure-related information defining at least one menu-structure-related characteristic, and on the basis of a user-provided content, the method comprising:

providing a sequence of video frames, in accordance with claim 14, wherein providing the sequence of video frames comprises generating the sequence of video frames on the basis of the scene model, on the basis of the additional information defining at least one menu-structure-related characteristic, and on the basis of the user-provided content.

21. A non-transitory digital storage medium comprising a computer program for executing the method of claim 14, when the computer program runs on a computer.

22. Apparatus for providing a sequence of video frames on the basis of a scene model defining a three-dimensional pre-modeled scene, the scene model comprising at least one three-dimensional scene model object having an object name or an object property, and on the basis of a user-provided content in the form of one or more three-dimensional objects, the apparatus comprising:

a video frame generator adapted to produce a sequence of a plurality of video frames on the basis of the scene model, wherein the video frame generator is adapted to parse the scene model to identify within the scene model one or more scene model objects having a predetermined object name or a predetermined object property, to obtain an identified three-dimensional scene model object;

wherein the video frame generator is adapted to replace the identified scene model object with the user-provided content, to adapt the scene model to user requirements; and wherein the video frame generator is adapted to render the sequence of video frames on the basis of the scene model, such that the user-provided content is displayed a replacement for the identified scene model objects;

wherein the scene model defines a scene in terms of a listing of geometrical objects and characteristics of the objects present in the scene.

* * * * *